US006674274B2

(12) United States Patent
Hobrecht et al.

(10) Patent No.: US 6,674,274 B2
(45) Date of Patent: Jan. 6, 2004

(54) MULTIPLE PHASE SWITCHING REGULATORS WITH STAGE SHEDDING

(75) Inventors: Stephen W. Hobrecht, Los Altos, CA (US); Randy G. Flatness, Los Gatos, CA (US)

(73) Assignee: Linear Technology Corporation, Milpitas, CA (US)

( * ) Notice: Subject to any disclaimer, the term of this patent is extended or adjusted under 35 U.S.C. 154(b) by 146 days.

(21) Appl. No.: 09/780,649

(22) Filed: Feb. 8, 2001

(65) Prior Publication Data

US 2002/0135338 A1 Sep. 26, 2002

(51) Int. Cl.[7] .................................................. G05F 1/40
(52) U.S. Cl. ........................ 323/285; 323/268; 323/284; 363/65
(58) Field of Search ................................. 323/268, 271, 323/272, 282, 284, 285; 363/65, 67, 69, 71

(56) References Cited

U.S. PATENT DOCUMENTS

| 3,458,798 A | 7/1969 | Fang et al. |
| 3,571,697 A | 3/1971 | Phillips |
| 3,579,091 A | 5/1971 | Clarke et al. |

(List continued on next page.)

FOREIGN PATENT DOCUMENTS

| EP | 0 428 377 A2 | 5/1991 |
| GB | 2144887 | 3/1985 |
| JP | 60-32565 | 2/1985 |
| JP | 60-156269 | 8/1985 |
| JP | 63-307510 | 12/1988 |
| JP | 3-113986 | 11/1991 |
| JP | 4-42771 | 2/1992 |
| JP | 4-49844 | 2/1992 |
| JP | 4-101286 | 9/1992 |
| JP | 4-128086 | 11/1992 |

OTHER PUBLICATIONS

Siliconix, Si9150 documents bearing Bates Nos. U040269–71, 9104.
Texas Instruments Data Sheet for TPS5120 "Dual Output, Two–Phase Synchronous Buck DC/DC Controller", Revised Feb. 2001.
Intersil Data Sheet for ISL6223, Mar. 2001.
Linear Technology Data Sheet for LTC1702, pp. 1–36.
1992 Linear Databook Supplement at pp. 7–13 to 7–22, published by Linear Technology Corporation, Milpitas, California in 1992.
1995 Linear Databook vol. IV at pp. 4–360 to 4–373, published by Linear Technology Corporation, Milpitas, California in 1995.

(List continued on next page.)

Primary Examiner—Jessica Han
(74) Attorney, Agent, or Firm—Fish & Neave; Joel Weiss; Jeffrey C. Aldridge

(57) ABSTRACT

Multiple phase switching regulators with stage shedding are provided. Multiple phase switching regulators of the present invention have a plurality of single phase switching regulators coupled in parallel to an output capacitor. The plurality of single phase switching regulators supply current to a load at a regulated voltage. A comparator monitors the load current and causes one or more of the single phase switching regulators to be OFF at a low load current threshold. At least one of the single phase switching regulators that remains ON increases its output current so that the multiple phase switching regulator output current continues to match the load current. The present invention may include a second comparator that causes additional single phase switching regulators to be OFF at a second low load current threshold that is lower than the first low load current threshold.

47 Claims, 10 Drawing Sheets

U.S. PATENT DOCUMENTS

| | | | |
|---|---|---|---|
| 3,581,186 A | 5/1971 | Weinberger | |
| 3,582,758 A | 6/1971 | Gunn | |
| 3,585,491 A | 6/1971 | Petersen | |
| 3,733,540 A | 5/1973 | Hawkins | |
| 3,764,889 A | 10/1973 | Nowell | |
| 3,772,588 A | 11/1973 | Kelly et al. | |
| 3,784,893 A | 1/1974 | Rando | |
| 3,863,128 A | 1/1975 | Wilwerding | |
| 3,879,647 A | 4/1975 | Hamilton et al. | |
| 3,992,638 A | 11/1976 | Sauvanet | |
| 4,013,939 A | 3/1977 | Biess et al. | |
| 4,035,710 A | 7/1977 | Joyce | |
| 4,071,884 A | 1/1978 | Maigret | |
| 4,137,489 A | 1/1979 | Lipo | |
| 4,160,288 A | 7/1979 | Stuart et al. | |
| 4,174,534 A | 11/1979 | Kotlarewsky | |
| 4,177,389 A | 12/1979 | Schott | |
| 4,194,147 A | 3/1980 | Payne et al. | |
| 4,257,090 A | 3/1981 | Kröger et al. | |
| 4,326,245 A | 4/1982 | Saleh | |
| 4,359,679 A | 11/1982 | Regan | |
| 4,395,675 A | 7/1983 | Toumani | |
| 4,417,197 A | 11/1983 | Schwarz | |
| 4,428,015 A | 1/1984 | Nesler | |
| 4,462,069 A | 7/1984 | Becky | |
| 4,479,174 A | 10/1984 | Cates | |
| 4,493,017 A | 1/1985 | Kammiller et al. | |
| 4,519,024 A | 5/1985 | Federico et al. | |
| 4,541,041 A | 9/1985 | Park et al. | |
| 4,554,499 A | 11/1985 | Sherman et al. | |
| 4,578,630 A | 3/1986 | Grosch | |
| 4,610,521 A | 9/1986 | Inoue | |
| 4,634,956 A | 1/1987 | Davis et al. | |
| 4,672,303 A | 6/1987 | Newton | |
| 4,672,518 A | 6/1987 | Murdock | |
| 4,674,020 A | 6/1987 | Hill | |
| 4,683,529 A | 7/1987 | Bucher, II | |
| 4,706,177 A | 11/1987 | Josephson | |
| 4,709,315 A | 11/1987 | Ramos | |
| 4,712,169 A | 12/1987 | Albach | |
| 4,716,514 A | 12/1987 | Patel | |
| 4,727,308 A | 2/1988 | Huljak et al. | |
| 4,734,844 A | 3/1988 | Rhoads | |
| 4,748,397 A | 5/1988 | Ogawa et al. | |
| 4,754,385 A | 6/1988 | McDade et al. | |
| 4,801,859 A | 1/1989 | Dishner | |
| 4,813,066 A | 3/1989 | Holtz et al. | |
| 4,814,684 A | 3/1989 | McCurdy | |
| 4,819,122 A | 4/1989 | Gontowski, Jr. | |
| 4,823,070 A | 4/1989 | Nelson | |
| 4,843,532 A | 6/1989 | Freedman | |
| 4,866,587 A | 9/1989 | Wadlington | |
| 4,870,555 A | 9/1989 | White | |
| 4,884,183 A | 11/1989 | Sable | |
| 4,902,957 A | 2/1990 | Cassani et al. | |
| 4,920,309 A | 4/1990 | Szepesi | |
| 4,922,404 A | 5/1990 | Ludwig et al. | |
| 4,924,170 A | 5/1990 | Henze | |
| 4,928,200 A | 5/1990 | Redl et al. | |
| 4,929,882 A | 5/1990 | Szepesi | |
| 4,931,716 A | 6/1990 | Jovanovic et al. | |
| 4,996,638 A | 2/1991 | Orr | |
| 5,028,861 A | 7/1991 | Pace et al. | |
| 5,034,871 A | 7/1991 | Okamoto et al. | |
| 5,066,900 A | 11/1991 | Bassett | |
| 5,068,575 A | 11/1991 | Dunsmore et al. | |
| 5,081,411 A | 1/1992 | Walker | |
| 5,097,196 A | 3/1992 | Schoneman | |
| 5,128,603 A | 7/1992 | Wölfel | |
| 5,134,355 A | 7/1992 | Hastings et al. | |
| 5,138,249 A | 8/1992 | Capel | |
| 5,144,547 A | 9/1992 | Masamoto | |
| 5,170,333 A | 12/1992 | Niwayama | |
| 5,177,676 A | 1/1993 | Inam et al. | |
| 5,179,511 A | 1/1993 | Troyk et al. | |
| 5,184,129 A | 2/1993 | Fung et al. | |
| 5,193,211 A | 3/1993 | Nobusawa | |
| 5,237,606 A | 8/1993 | Ziermann | |
| 5,309,078 A | 5/1994 | Cameron | |
| 5,396,412 A | 3/1995 | Barlage | |
| 5,408,162 A | 4/1995 | Williams | |
| 5,469,349 A | 11/1995 | Marinus | |
| 5,481,178 A | 1/1996 | Wilcox et al. | |
| 5,528,483 A | 6/1996 | Mohandes | |
| 5,548,189 A | 8/1996 | Williams | |
| 5,568,044 A | 10/1996 | Bittner | |
| 5,627,460 A | 5/1997 | Bazinet et al. | |
| 5,731,731 A | 3/1998 | Wilcox et al. | |
| 5,747,976 A | 5/1998 | Wong et al. | |
| 5,804,950 A | 9/1998 | Hwang et al. | |
| 5,808,453 A | 9/1998 | Lee et al. | |
| 5,883,797 A | 3/1999 | Amaro et al. | |
| 5,905,369 A | 5/1999 | Ishii et al. | |
| 5,912,552 A | 6/1999 | Tateishi | |
| 5,969,512 A | 10/1999 | Matsuyama | |
| 5,994,885 A | 11/1999 | Wilcox et al. | 323/285 |
| 6,043,634 A | 3/2000 | Nguyen et al. | |
| 6,130,528 A | 10/2000 | Aoyama | |
| 6,144,194 A | 11/2000 | Varga | |
| 6,281,666 B1 * | 8/2001 | Tressler et al. | 363/65 X |
| 6,362,608 B1 * | 3/2002 | Ashburn et al. | 363/65 X |

OTHER PUBLICATIONS

1996 Linear Databook vol. V at pp. 4–212 to 4–230, published by Linear Technology Corporation, Milpitas, California in 1996.

1996 Linear Databook vol. V at pp. 4–231 to 4–258, published by Linear Technology Corporation, Milpitas, California in 1996.

Ashok Bindra, "Multiphase Controller Meets Pentium's Power Demands," Electronic Design, 46(18): 28–34 (Aug. 3, 1998).

Semtech Corp., SC1144 Datasheet, Preliminary—Aug. 4, 1988.

Semtech Corp., SC1144EVB User's Manual, Preliminary Sep. 1, 1998.

Semtech Corp., SC1144 Datasheet, Preliminary—Aug. 24, 1999.

Rudolf F. Graf, *Modern Dictionary of Electronics*, Indianapolis: Sams & Co., 1984.

Irving M. Gottlieb, *Practical Power–Control Techniques*, Indianapolis: Sams & Co., 1987.

Leo F. Casey, "Circuit Design for 1–10 MHz DC–DC Conversion," pp. 1–14 and 73–80, Jan. 1989.

Maxim Data Sheet for MAX635/36/37, pp. 6/49–6/56, 1989.

Maxim Data Sheet for MAX638, pp. 6/57–6/64, 1989.

S. Peitkiewicz, "A Low–Voltage, Micro–Power 1A Switching Regulator," International Solid State Circuits Conference, pp. 1–5, 1990.

Micro Linear Data Sheet for ML4822, p. 1, Aug. 1991.

Siliconix Data Sheet for SI9150, pp. 1–17, application data sheets (3 pp.), Sep. 1991.

Brian Huffman, "Linear Technology Application Note 46," Nov. 1991.

Maxim Data Sheet for MAX639, pp. 1–8, Dec. 1991.

Irving M. Gottleib, *Electronic Power Control*, Indianapolis: Tab Books, 1991.

"Linear Technology Magazine," vol. 2, No. 1, pp. 1, 12, and 19, Feb. 1992.

Micro Linear Data Sheet for ML4860, p. 1, Feb. 1992.

Micro Linear Data Sheet for ML4861, pp. 6/146–6/150, Jul. 1992.

Max782 EV Kit, Mar. 1993.

"Linear Technology Magazine," vol. 2, No. 3, pp. 1, 18, and 19, Oct. 1992.

Linear Technology Data Sheet for LT1073, pp. 1–20.

Linear Technology Data Sheet for LT1846/1847, LT3846/3847, pp. 5/113–5/120.

Williams, J. and Huffman, B., "Proper instrumentation eases low power dc/dc converter design," *EDN*, Oct. 27, 1988.

Chryssis, George, "High–frequency Switching Power Supplies," pp. 144–152 and 180–181, McGraw–Hill, 1989.

Linear Technology, "LT1846/1847, LT3846.3847 Current Mode PWM Controller," Datasheet, 1990.

Huffman, B., "Efficiency and Power Characteristics of Switching Regulator Circuits," Application Note 46, Linear Technology, 11/91.

Gold, S., "Design Techniques for Electrostatic Discharge Protection," Linear Technology, 10/92.

Unitrode, "UC1846/7, UC2846/7, UC3846/7 Current Mode PWM Controller," Datasheet, dated 1/97 (date of first publication unknown).

Y.S. Lee and Y.C. Cheng, "Design of Switching Regulator with Combined FM and On–Off Control," *IEEE Transactions on Aerospace and Electronic Systems*, vol. AES–22, No. 6, Nov. 1986, pp. 725 to 731.

Jim Williams and Brian Huffman, "Some Thoughts on DC–DC Converters," *Linear Technology Application Note #29*, Oct. 1988, pp. AN29–1 to AN29–39.

Jim Williams, "Step Down Switching Regulators," *Linear Technology Application Note #35*, Aug. 1989, pp. AN35–1 to AN35–32.

Cassani et al., "Sophisticated Control IC Enhances 1MHz Current Controlled Regulator Performance," *High Frequency Power Conversion 1992*, May 1992 Proceedings, pp. 167 to 173.

Maxim Integrated Products Data Book, "Triple–Output Power–Supply Controller for Notebook Computers," 19–0045, Revision 1; May 1994, pp. 1 to 28.

Analog Devices, Inc., "High Efficiency Synchronous Step–Down Switching Regulators ADP1148, ADP1148–3.3, ADP1148–5," Analog Devices,pp. 1–14, 1997.

Archer, William R., "Current Drives Synchronous Rectifier," EDN, Nov. 28, 1985.

Archer, William R., "Current–Driven Synchronous Rectifier," Motorola TMOS Power FET Design Ideas, BR316, pp. 9–10, 1985.

Blanchard, Richard, et al., "MOSFETs, Schottky Diodes Vie for Low–Voltage–Supply Designs," EDN, p. 197, Jun. 28, 1984.

Borghi et al., "Discontinuous Conduction Mode Power Switching Regulator IC," PCI Oct. 1988 Proceedings, pp 31–41, 10/88.

Brown, Marty, "Practical Switching Power Supply Design," pp. 20–34, Academic Press, Inc., 1990.

Business Wire, "Micro Linear announces first single–chip power controller for notebook computers," Apr. 16, 1992.

Chetty, P.R.K., "DC timers control dc–dc converter" Electronics, pp. 121 & 123, Nov. 13, 1975.

Dell Computer Corporation, "Dell Computer Corporation Introduces Advanced Notebook PC," (alleged to contain UC1895 (see Unitrode Advance Information Datasheet, Oct. 5, 1992), 09/91.

Dinsmore, D., "Dual regulator handles two input voltages," EDN, Jan. 21, 1993.

Fisher, R.A. et al., "Performance of Low Loss Synchronous Rectifiers in a Series–Parallel Resonant DC–DC Converter," Proceedings of the Fourth Annual IEEE Applied Power Electronics Conference and Exposition, pp. 240–246, 03/89.

Gauen, Kim, "Synchronous Rectifier Improves Step–Down Converter Efficiency," PCIM, pp. 8, 11–12 & 14–15, 04/93.

Gontowski et al., "Advanced New Integrated Circuits For Current–Mode Control," Proceedings of the Power Electronics Show and Conference, pp. 341–352, 10/88.

Goodenough, F., "Raise Switcher Efficiency Above 90%", Electronic Design, Jan. 21, 1993.

Goodenough, Frank, "Low–Voltage Analog ICs Wait in the Wings," Electronic Design, Sep. 3, 1992.

Goodenough, Frank, "Synchronous Rectifier UPS PC Battery Life," Electronic Design, pp. 47–53, Apr. 16, 1992.

Goodenough, F., "Dozing IC Op Amps Wake Up For Input Signal," Electronic Design, Dec. 5, 1991.

Gracie, Paul D., "Intermittent Converter Saves Power," EDN, p. 151, Sep. 1, 1989.

Grant, Duncan A. et al., "Power MOSFETS, Theory and Applications," pp. 239–256, Wiley–Interscience, 1989.

Harris Semiconductor, "HIP 5060 Power Control IC Single Chip Power Supply", Datasheet, 04/94.

Harris Semiconductor, "HIP 5060 Power Control IC Single Chip Power Supply", Datasheet, 05/92.

Harris Semiconductor, "HIP 5060 Power Control IC Single Chip Power Supply", Preliminary Datasheet, 01/92.

Harris Semiconductor, Hodgins et al., "HIP 5060 Family of Current Mode Control ICs Enhance 1 MHZ Regulator Performance," Application Note AN9212.1, pp. 11–191–11–197, 1992.

Hewett, S., "Improved Switched Mode Power Supply Regulation by Eliminating Turn–off Spikes," IBM Technical Disclosure Bulletin, vol. 31, No. 4, pp. 97–98, 09/88.

Hnatek, Eugene R. "Design of Solid State Power Supplies", 3rd Ed., pp. 65–70, 1989.

Horowitz & Hill, "The Art of Electronics," pp. 356–359, Cambridge University Press, 1989.

Ikeda, S. et al., "Power MOSFET for Switching Regulator," International Telecommunications Energy Conference, 10/82.

Impala Linear, "ILC6350 Dual Output Synchronous Step–Down DC–DC Controller," Advanced Information Preliminary Datasheet, pp. 1–6, Jan. 1997.

Impala Linear, "ILC6311 Synchronous 3A Switching Regulator With Auto–Light Load Mode ," Preliminary Datasheet, pp. 30–38, Jan. 1997.

Impala Linear, "ILC6310 Synchronous Step–down DC–DC Converter With Auto Light–Load Mode Select," Final Datasheet, pp. 21–38, Jun. 1996.

Impala Linear, "ILC6330 13A Adjustable Synchronous DC–DC Controller," Preliminary Datasheet, pp. 39–41, Jun. 1996.

International Rectifier, "IR Application Note AN–978, HV Floating MOS–Gate Driver ICs, 2. A Typical Block Diagram," Application Note from web page, Date Unknown.

International Rectifier, "IR Application Note AN–978, HV Floating MOS Gate Driver ICs, 2. Full Bridge With Current Mode Control," Application Note from web page, Date Unknown.

International Rectifier, Clemente et al., "HIV Floating MOS–Gate Driver IC," Application Note AN–978A, 1990.

Kassakian, J. et al., "Principles of Power Electronics," pp. 103–165, Addison–Wesley Publishing Company, 1991.

Kerridge, Brian, "Battery power breeds efficient regulators," EDN, pp. 103–108, Mar. 18, 1993.

Lee, et al., "Design of Switching Regulator with Combined FM and On–Off Control," IEEE Transactions on Aerospace and Electronic Systems, vol. AES–22, No. 6, pp. 725–731, 11/86.

Lee, Y. S. and Cheng, Y. C. "A 580 kHz switching regulator using on–off control," Journal of the Institution of Electronic and Radio Engineers, vol. 57, No. 5, pp. 221–226, 09/87.

Linear Technology, "LT1271/LT1269 4A High Efficiency Switching Regulators," Datasheet, 1992.

Linear Technology, "LT1432 5V High Efficiency Step–Down Switching Regulator Controller," Datasheet, 1992.

Linear Technology, "LT1170/LT1171/LT1172 100kHz, 5A, 2.5A and 1.25A High Efficiency Switching Regulators," Datasheet, 1991.

Linear Technology, "LT1524/LT3524 Regulating Pulse Width Modulator," 1990.

Linear Technology, "LT1072 1.25A High Efficiency Switching Regulator," Datasheet, 1990.

Linear Technology, "LT1074 Switching Regulator," Preliminary Datasheet, 06/89.

Linear Technology, Nelson, C., App. Note 19, "LT–1070 Design Manual," 06/86.

Linear Technology, Pietkiewicz et al., "DC–DC Converters for Portable Computers," Design Note 52, 1991.

Linear Technology, Wilcox, M., "LT1158: Low Voltage, N–Channel Bridge Design Made Easy," Datasheet, 1992.

Linear Technology, Williams, J., App. Note 35, "Step Down Switching Regulators," 08/89.

Linear Technology, Williams, J. et al., App. Note 29, "Some Thoughts on DC–DC Converters," 10/88.

Linear Technology, Williams, J., App. Note 25, "Switching Regulators for Poets A Gentle Guide for the Trepidatious," 09/87.

Markus, John, "Guidebook of Electronic Circuits," pp. 647 & 649, 1971.

Maxim Integrated Products, "MAX1630–MAX1635 Multi–Output, Low–Noise Power Supply Controllers for Notebook Computers," Datasheet, 4/97.

Maxim Integrated Products, "MAX798 High–Accuracy Step–Down Controller With Synchronous Rectifier for CPU Power," Datasheet, 12/96.

Maxim Integrated Products, "MAX887 100% Duty Cycle, Low–Noise, Step–Down, PWM DC–DC Converter," Datasheet, 9/96.

Maxim Integrated Products, "MAX777L/MAX778L/MAX779L Low–Voltage Input, 3V/3.3V/5V Adjustable Output, Step–Up DC–DC Converters," Datasheet, 07/96.

Maxim Integrated Products, "MAX796/MAX797/MAX799 Step–Down Controllers With Synchronous Rectifier for CPU Power," Datasheet, 11/94.

Maxim Integrated Products, "MAX782 Triple–Output Power–Supply Controller for Notebook Computers," Datasheet, 5/94.

Maxim Integrated Products, "MAX783 Triple–Output Power–Supply Controller for Notebook Computers," Datasheet, 05/94.

Maxim Integrated Products, "MAX746 High–Efficiency, PWM, Step–Down, N–Channel DC–DC Controller," Datasheet, 11/93.

Maxim Integrated Products, "MAX747 High–Efficiency PWM, Step–Down P–Channel DC–DC Controller," Datasheet, 09/93.

Maxim Integrated Products, "MAX782/MAX786 Notebook Computer Power Supplies" Advance Information Datasheet, 02/93.

Meakin, Mike, "The LM3578 Switching Power Regulator," Electronic Engineering, pp. 47–52, 07/86.

Micro Linear, "ML4862 Battery Power Control IC," Datasheet, 01/97.

Micro Linear, "ML4873 Battery Power Control IC," Advance Information Datasheet, Mar. 15, 1993.

Micro Linear, "ML4873 Battery Power Control IC," Datasheet, 01/97 (preliminary version 03/93–cited above).

Micro Linear, "ML4862 Battery Power Control IC,"0 Datasheet, 07/92.

Micro Linear, "ML4862 EVAL User's Guide," 06/92.

Myers, R. and Peck, R., "200–kHz Power FET Technology in New Modular Power Supplies," Hewlett–Packard Journal, 08/81.

NASA Jet Propulsion Laboratory, "Synchronous Half–Wave Rectifier," 07/89.

National Semiconductor Corporation, "LM1578/LM2578/LM3578 Switching Regulator," Preliminary Datasheet, 1987.

Patel, R., "Bipolar synchronous rectifiers cut supply losses," EDN, Apr. 4, 1985.

Patel, Raoji, "Using Bipolar Synchronous Rectifiers Improves Power Supply Efficiency," Proceedings of the Power Sources Conference, 11/84.

Quinnell, Richard A., "Analog IC Combines Five Functions for Battery Power Management," EDN, Apr. 23, 1992.

Redl, et al., "Overload–Protection Methods For Switching–Mode DC/DC Converters: Classification, Analysis, and Improvements," PESC '87 Record, pp. 107–118, 1987.

Redl et al., "Frequency Stabilization and Synchronization of Free–Running Current–Mode Controlled Converters," PESC '86 Record, pp. 519–530, 1986.

Rippel, W.E., "Synchronous Half–Wave Rectifier," JPL Technical Support Package, 07/89.

Sakai, E. and Harada, K., "A New Synchronous Rectifier Using Bipolar Transistor Driven by Current Transformer," Fourteenth International Telecommunications Energy Conference, pp. 424–429, 10/92.

Sakai, E. and Harada, K., "Synchronous Rectifier Using a Bipolar Transistor Driven by Current Transformer," Journal of the Society of Electronic Data Communication, vol. J–74–B–I, No. 8, pp. 639–646, 08/91 (in Japanese, with translation).

Savant, C.J., Jr., et al., "Electronic Design: Circuits and Systems," pp. 612–613, The Benjamin/Cummings Publishing Co., 1991.

Shepard, J., "Powering portable systems," EDN, Nov. 5, 1992.

Siliconix, "Si9150 Synchronous Buck Converter Controller, S–42667, Rev. D," Datasheet, Feb. 14, 1995.

Siliconix, "Si9150CY/BCY Synchronous Buck Converter Controller," Preliminary Data Sheet, Oct. 8, 1992.

Siliconix, "Designing DC/DC Converters with the Si9110 Switchmode Controller," Siliconix Power Products Data Book, 1991.
Siliconix, "Si91XX Synchronous Buck Controller," Datasheet, Dec. 20, 1990.
Siliconix, "Si9110/Si9111 High–Voltage Switchmode Controllers," Datasheet, 10/87.
Siliconix, "Synchronous Rectification," Design Ideas, 10/80.
Siliconix, "High–Efficiency Buck Converter for Notebook Computers," Application Note AN92–4, Date Unknown.
Soclof, Sidney, "Applications of Analog Integrated Circuits," Figure 2.25, pp. 74–75, Prentice–Hall, Inc. 1985.
Sokal et al., "Control Algorithms and Circuit Designs For Optimally Flyback–Charging an Energy–Storage Capacitor," IEEE Fifth Applied Power Electronics Conference, pp. 295–301, 1990.
Steigerwald, R., "High–Frequency Resonant Transistor DC–DC Converters," IEEE Transactions on Industrial Electronics, vol. IE–31, No. 2, pp. 181–191, 05/84.
Taylor, "Flyback Converter," Electronic Engineering, p. 23, Jul. 07/76.
Toyota, "SB3052P Dual Channel Step Down DC–DC Converter Controller," Datasheet, Feb. 1998.
Toyota, "SB3011P Step Down DC–DC Converter Controller," Datasheet, Mar. 1997.
Toyota, "SB3012P Step Down DC–DC Converter Controller," Datasheet, Mar. 1997.
Toyota, "SB3013P Step Down DC–DC Converter Controller," Datasheet, Mar. 1997.
Toyota, "S3020P Dual Channel Step Down DC–DC Converter Controller," Datasheet, Mar. 1997.
Toyota, "SB3050P Dual Channel Step Down DC–DC Converter Controller," Datasheet, Mar. 1997.
Toyota, "SB3030P Step Down DC–DC Converter Controller," Datasheet, Dec. 1996.
Toyota, "SB3031P Step Down DC–DC Converter Controller," Datasheet, Dec. 1996.
Toyota, "SB3010P Synchronous Stepdown DC–DC Converter Controller," Datasheet Aug. 10, 1995.
Uchida, Takahito, "Control Circuit for Switching Regulator," Japanese Inventor Associated Disclosed Technology Publication No. 92–2362, published Feb. 15, 1992 (in Japanese, with translation).
Unitrode, "UCC19411/2/3, UCC29411/2/3, UCC39411/2/3 Low Power Synchronous Boost Converter," Preliminary Datasheet, 4/98.
Unitrode, "UCC3941–3/–5–ADJ 1V Synchronous Boost Converter," Preliminary Datasheet, 3/97.
Unitrode, "UCC1582, UCC2582, UCC3582 High Efficiency Synchronous, Step Down Controller," Preliminary Datasheet, 1/97.
Unitrode, "UC1895, UC2895, UC3895 Synchronous Rectifier Buck PWM Controller," Advance Information Datasheet, Oct. 5, 1992.
Unitrode, "Using Bipolar Synchronous Rectifiers Improves Power Supply Efficiency," Application Note, 06/85.
Wilcox, M., "The LT1158: Half Bridge N–Channel Power MOSFET Driver," Linear Technology, 02/92.
Williams, J., "Designing supplies for powering LCD backlighting," EDN, Oct. 29, 1992.
Williams, J., "1.5 to 5V converter supplies 200mA," EDN, Oct. 15, 1992.

Williams, J., "Correcting power–supply problems," EDN, Dec. 10, 1991.
Williams, Jim, "Basic Principles and Ingenious Circuits Yield Stout Switchers," EDN, Jan. 19, 1990.
Williams, J., "Astute designs improve efficiencies of linear regulators," EDN, Aug. 17, 1989.
Williams, J., "Design linear circuits that serve digital system needs," EDN, Apr. 27, 1989.
Williams, J., "Clever techniques improve thermocouple measurements," EDN, May 26, 1988.
Williams, J., "Galvanically isolated switching supplies provide high power," EDN, Nov. 26, 1987.
Williams, J., "Regulator IC speeds design of switching power supplies," EDN, Nov. 12, 1987.
Williams, J., "Signal conditioning circuits use μpower design techniques," EDN, Aug. 20, 1987.
Williams, J., "Micropower circuits assist low–current signal conditioning," EDN, Aug. 6, 1987.
Williams, J., "Switching regulator takes on more power," Electronic Product Design, 01/86.
Williams, J., "Considerations for Five Volt Linear Circuits," Professional Program Session Record 20, Circuits for Analog Signal Processing and Data Conversion is Single +5V Supply Systems, Wescon/85, 11/85.
Williams, J., "Analog circuits operate from a 1.5V cell," EDN, Sep. 19, 1985.
Williams, J., "Refine V/F–converter operation with novel design techniques," EDN, May 30, 1985.
Williams, J., "Design techniques extend V/F–converter performance," EDN, May 16, 1985.
Williams, J., "Design linear circuits for 5V operation," EDN, May 2, 1985.
Williams, J., "Chopper amplifier improves operation of diverse circuits," EDN, Mar. 7, 1985.
Williams, J., "Use low–power design methods to condition battery outputs," EDN, Oct. 18, 1984.
Williams, J., "Special circuit–design techniques enhance regulator performance," EDN, Sep. 1, 1983.
Williams, J., "Conversion techniques adapt voltages to your needs," EDN, Nov. 10, 1982.
Williams, J., "Design dc–dc converters to catch noise at the source," Electronic Design, Oct. 15, 1981.
Williams, J., "Employ pulse–width modulators in a wide range of controllers," EDN, Sep. 2, 1981.
Williams, J., "Bridge forms synchronous rectifier," EDN, Date Unknown.
Williams, J. and Huffman, B., "Switched–capacitor networks simply dc/dc–converter designs," EDN, Nov. 24, 1988.
Williams, J. and Huffman, B., "Design dc/dc converters for power conservation and efficiency," EDN, Nov. 10, 1988.
Williams, J. and Huffman, B., "Proper instrumentation eases low–power dc/dc converter design," EDN, Oct. 27, 1988.
Williams, J. and Huffman, B., "Precise converter designs enhance system performance," EDN, Oct. 13, 1988.
Williams, J. and Dendinger, S., "Simplify feedback controllers with a 2–quadrant PWM IC," EDN, May 26, 1983.
Williams, J. and Waller, B., "Performance–Enhancement Techniques for Three–Terminal Regulators," New Electronics, Oct. 4, 1983.

* cited by examiner

MULTIPLE PHASE SWITCHING REGULATORS WITH STAGE SHEDDING

BACKGROUND OF THE INVENTION

This invention relates to multiple phase switching regulators. More particularly, this invention relates to multiple phase switching regulators with stage shedding.

A switching regulator is a power supply circuit that provides an output current to a load at a predetermined output voltage from an input voltage. Switching regulators can be designed to be highly efficient over a moderate range of load currents. Microprocessors have a broad range of current demand from very high peak currents to relatively low quiescent currents. Increasingly, microprocessors are requiring higher maximum output currents from switching regulators, which are continuing to operate over a wide output current dynamic range. As the range of output currents requirements expands, it becomes increasingly difficult to design a switching regulator that is efficient over a broad range of output currents.

Previously known multiple phase switching regulators include a plurality of switching regulators that are coupled in parallel to deliver high output currents to a load such as a microprocessor. A multiple phase switching regulator is an energy efficient DC/DC converter for supplying high output currents. The corresponding switching transistors in each switching regulator stage may be switched so that input current flows into only one regulator stage at a time. This technique reduces the amplitude of the output ripple current, input ripple current, and output ripple voltage.

However, previously known multiple phase switching regulators have poor efficiency at low output currents. Poor efficiency is due to the fact that the power required to turn the switching transistors ON and OFF becomes larger relative to the total power output of the regulator at low output currents.

One previously known single phase switching regulator circuit described in U.S. Pat. No. 5,481,178 discloses a technique called sleep mode for increasing efficiency in a switching regulator circuit at low load currents by not operating the switching transistors when the output capacitor is capable of maintaining the output voltage.

It would, therefore, be desirable to provide a multiple phase switching regulator that provides high efficiency over a broad range of load currents, including light load currents.

It would also be desirable to provide a multiple phase switching regulator that has a small amplitude output ripple current and output ripple voltage.

It would also be desirable to provide a multiple phase switching regulator that has a small amplitude input ripple current.

SUMMARY OF THE INVENTION

It is an object of the present invention to provide a multiple phase switching regulator that provides high efficiency over a broad range of load currents, including light load currents.

It is also an object of the present invention to provide a multiple phase switching regulator that has a small amplitude output ripple current and output ripple voltage.

It is also an object of the present invention to provide a multiple phase switching regulator that has a small amplitude input ripple current.

The present invention provides a multiple phase switching regulator with stage shedding that provides high efficiency at light load currents. The present invention also includes methods for providing high efficiency in a multiple phase switching regulator circuit using stage shedding. Multiple phase switching regulators of the present invention include a plurality of single phase switching regulator circuits coupled in parallel to an output capacitor. At high and moderate load currents, each single phase switching regulator circuit supplies output current to the load. When the load current falls below a first threshold, stage shedding is implemented during which one or more of the single phase switching regulator circuits are OFF during a first low power mode to increase efficiency. At least one single phase switching regulator circuit is maintained ON to supply output current in the first low power mode. The one or more single phase switching regulators that remain ON may increase their total output current to supply the load current.

Multiple phase switching regulators of the present invention may have any number N of low power modes. For example, one or more additional single phase switching regulators may be OFF in a second low power mode after the first low power mode has commenced. The second low power mode commences after the load current drops below a second threshold lower than the first threshold. The output current of the switching regulators that remain ON in the second low power mode increase their total output current to supply the load current. Multiple phase switching regulators of the present invention provide a low amplitude output ripple current, input ripple current, and output ripple voltage at light load currents.

BRIEF DESCRIPTION OF THE DRAWINGS

The above-mentioned objects and features of the present invention can be more clearly understood from the following detailed description considered in conjunction with the following drawings, in which the same reference numerals denote the same structural elements throughout, and in which.

DETAILED DESCRIPTION OF PREFERRED EMBODIMENTS

Multiple phase switching regulators of the present invention provide high output currents to a load by coupling a plurality of single phase switching regulators in parallel. The switching of the single phase switching regulators may be synchronized to provide low amplitude output ripple current and output ripple voltage. Multiple phase switching regulators of the present invention provide high efficiency at light load currents by causing one or more of the single phase switching regulators to be OFF during a low power mode. Products sold by Linear Technology Corporation of Milpitas, California under the trademark POLY-PHASE may comprise a type of multiple phase switching regulator.

Figure 1:
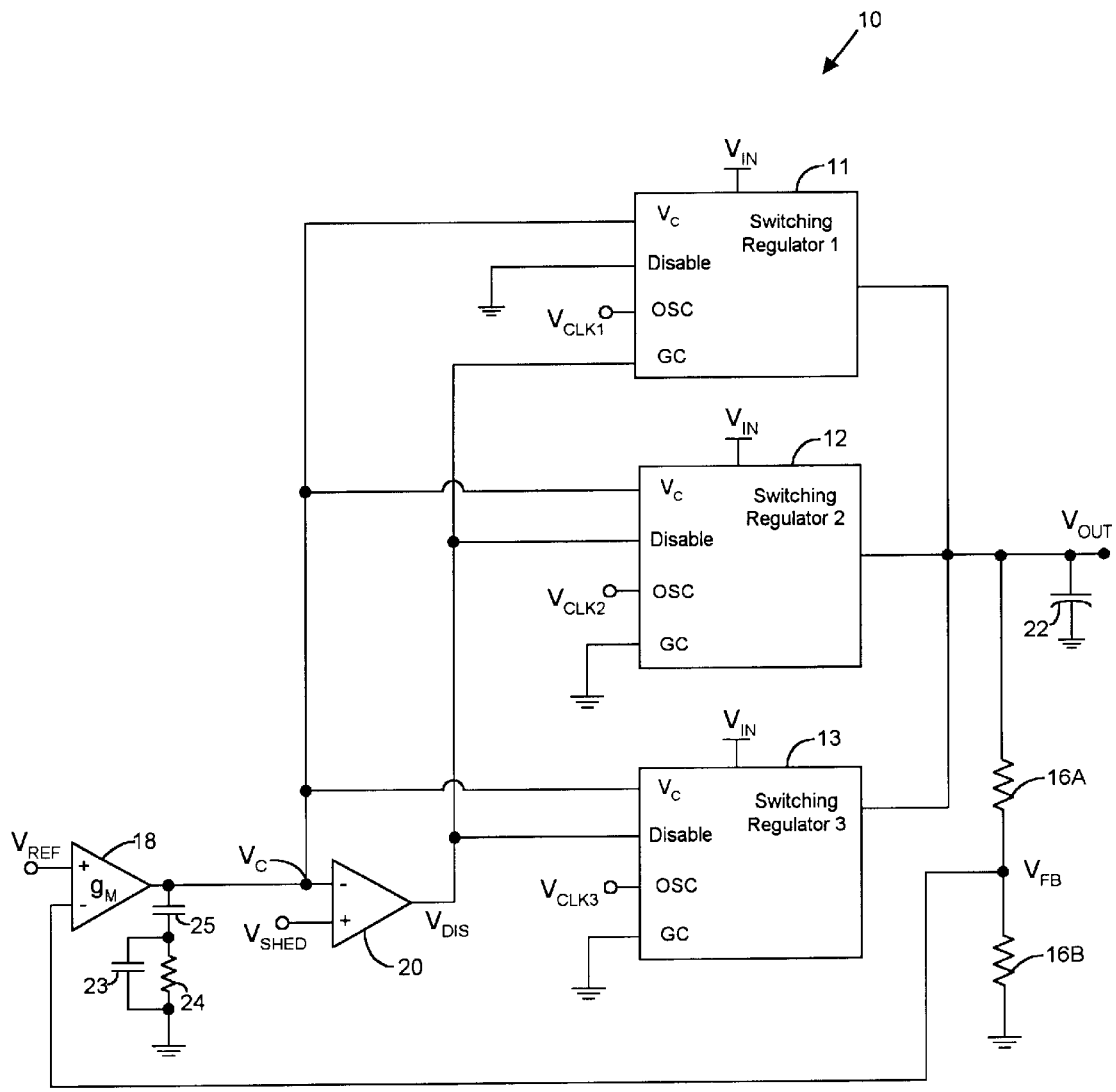
FIG. 1 is a schematic of a three stage high-efficiency multiple phase switching regulator in accordance with the principles of the present invention.

A first embodiment of the present invention is illustrated in FIG. 1 wherein multiple phase switching regulator 10 includes three single phase switching regulator circuits 11–13 coupled in parallel. Multiple phase switching regulator 10 operates in two modes of operation: a normal mode at high to moderate load currents and a low power mode at low load currents. In normal mode, all three single phase switching regulators are ON. In the low power mode, two switching regulators are OFF, and one switching regulator is ON, suppling 100% of the output current of regulator 10. The low power mode improves the efficiency of switching regulator 10 at light load currents.

Multiple phase switching regulator 10 shown in FIG. 1 is an embodiment of the present invention. Multiple phase switching regulator 10 includes three single phase switching regulator circuits 11–13, a resistor divider formed by resistors 16A and 16B, transconductance amplifier 18, low load comparator 20, output capacitor 22, and compensation circuitry including resistor 24, and capacitors 25 and 23. Switching regulators 11, 12 and 13 are coupled in parallel between input voltage $V_{IN}$ and output voltage $V_{OUT}$.

Regulator 10 has feedback loop circuitry that includes resistors 16A and 16B and transconductance amplifier 18. Resistors 16A and 16B comprise a resistor divider that is coupled to $V_{OUT}$. Resistor divider 16A/16B monitors $V_{OUT}$ and provides a voltage feedback signal $V_{FB}$ that is proportional to $V_{OUT}$ at the inverting input of transconductance amplifier 18 as shown in FIG. 1. Transconductance amplifier 18 monitors the feedback voltage $V_{FB}$ at its inverting input and compares $V_{FB}$ to a reference voltage $V_{REF}$ at its non-inverting input. $V_{FB}$ is approximately equal to $V_{REF}$. Transconductance amplifier 18 provides a current at its output. The voltage at the output of transconductance amplifier 18 is $V_C$, which is inversely proportional to $V_{FB}$. As $V_{FB}$ decreases, the output current of transconductance amplifier 18 and $V_C$ increase. As $V_{FB}$ increases, output current of transconductance amplifier 18 and $V_C$ decrease. Capacitors 23 and 25 and resistor 24 provide frequency compensation for the feedback loop. The output of transconductance amplifier 18 is coupled to the ICOMP input of switching regulators 11–13.

Figure 2:
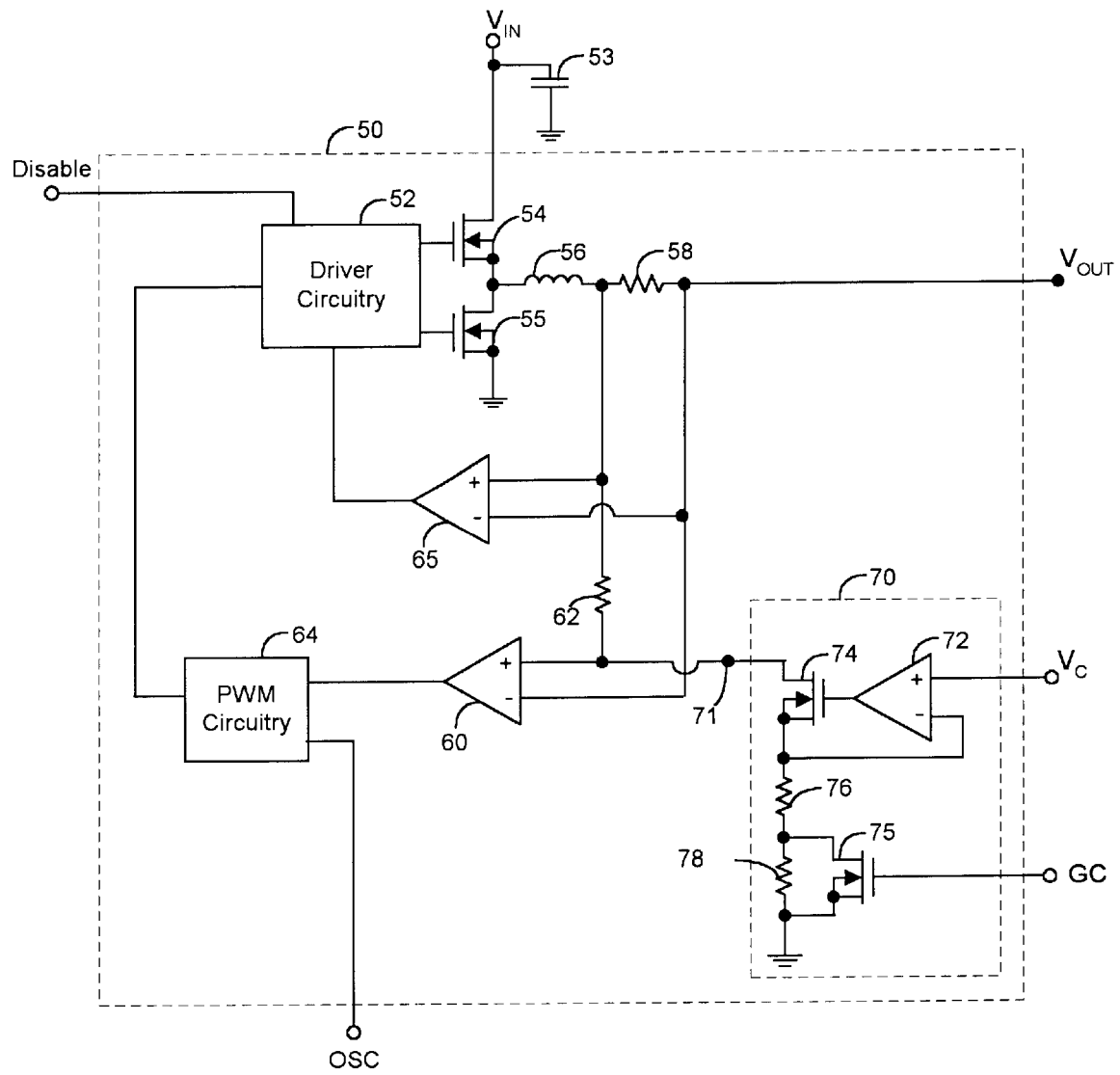
FIG. 2 is a schematic diagram of an exemplary synchronous switching regulator in accordance with the principles of the present invention.

Switching regulators 11, 12, and 13 are current-mode switching regulators that include an inductor. Switching regulators 11–13 are preferably synchronous switching regulators, but they also may be non-synchronous switching regulators. Synchronous switching regulator 50 shown in FIG. 2 is an example of a switching regulator circuit that may be used as switching regulators 11–13. Switching regulator 50 is a step-down, current mode, switching regulator, in which the input voltage $V_{IN}$ is greater than the output voltage $V_{OUT}$. Switching regulator 50 includes n-channel switching transistor MOSFETs 54 and 55, inductor 56, sense resistor 58, resistor 62, comparator 60, pulse-width modulation (PWM) circuitry 64, driver circuitry 52, reverse current comparator 65, and gain control circuit 70. Typically, circuitry of FIGS. 1 and 2 comprises an integrated circuit chip connected to a few external components. For example, capacitor 22, resistors 16A and 16B, MOSFETs 54 and 55, and inductor 56 may be external components and the rest of the circuitry of FIGS. 1 and 2 may be included in an integrated circuit.

Switching regulator 50 supplies output current to a load coupled to the output node at a regulated voltage $V_{OUT}$. Synchronous switching transistors 54 and 55 are switched ON and OFF by driver circuitry 52. Switching transistors 54 and 55 are driven out of phase with respect to each other to supply current to a load coupled to output capacitor 22. Additional circuitry (not shown) may be added to regulator 50 to provide a brief dead-time or blanking interval between the moment that one switching transistor turns OFF and the moment that the other switching transistor turns ON.

PWM circuitry 64 provides a constant frequency control for the duty cycle of switching transistors 54 and 55. The single phase switching regulator stages of the present invention such as switching regulators 11–13 may alternatively operate using a variable frequency, constant on-time or constant off-time technique to regulate the output voltage. For example, a one-shot circuit may be used as a timer to control the duty cycle of the switching transistors instead of PWM circuitry 64 as is known in the art.

PWM circuitry 64 is coupled to receive a clock signal (i.e., $V_{CLK1}$, $V_{CLK2}$, or $V_{CLK3}$) at the OSC input. PWM circuitry 64 may include a latch such as a flip-flop. When the clock signal at OSC goes HIGH, PWM circuitry 64 sends a signal to driver circuitry 52 that turns switching transistor 54 ON and turns switching transistor 55 OFF. Current now flows from input voltage $V_{IN}$ through switching transistor 54, inductor 56, and sense resistor 58 to $V_{OUT}$. The current through inductor 56 ramps up, because $V_{IN}$ is greater than $V_{OUT}$.

The current through inductor 56 substantially equals the current through sense resistor 58. Current comparator 60 monitors the voltage across sense resistor 58. The current through resistor 62 sets a peak inductor current threshold for comparator 60. When the inductor current ramps up to the current threshold of current comparator 60, the output of comparator 60 goes HIGH, and PWM circuitry 64 sends a signal to driver circuitry 52 that causes switching transistor 54 to turn OFF and switching transistor 55 to turn ON. Current then flows from ground through switching transistor 55, inductor 56, and sense resistor 58 to $V_{OUT}$. Current now ramps down in inductor 56. The switching cycle repeats when the clock signal at OSC goes HIGH again. Any of switching regulators 11–13 (and single phase switching regulators of the present invention) may include a comparator or amplifier that monitors the average inductor current or the minimum instantaneous inductor current instead of the peak inductor current.

If the load current is low, the instantaneous current through inductor 56 may ramp down to zero and become negative while switching transistor 55 is ON. Negative inductor current draws power from output capacitor 22 to ground decreasing efficiency. Comparator 65 has been added to improve the efficiency of the regulator. If the inductor current ramps down to zero, zero-current comparator 65 sends a signal to driver 52 causing it to turn switching transistor 55 OFF. As a result, both switching transistors are OFF preventing power from flowing from output capacitor 22 to ground through switching transistor 55.

Gain control circuit 70 in FIG. 2 is coupled to the non-inverting input of comparator 60. Gain control circuit 70 includes amplifier 72, n-channel MOSFETs 74 and 75, and resistors 76 and 78. The gate of MOSFET 75 is coupled to the GC input of regulator 50. The GC input is coupled to receive the output voltage $V_{DIS}$ of low load comparator 20 in switching regulator 11. GC is coupled to ground in switching regulators 12 and 13. $V_C$ is coupled to the non-inverting input of amplifier 72. The gate of MOSFET 74 is coupled to the output of amplifier 72, and the source of MOSFET 74 is coupled to the inverting input of amplifier 72. Resistors 76 and 78 are coupled in series between the source of MOSFET 74 and ground. MOSFET 75 shorts a current path around resistor 78 when it is ON, because MOSFET 75 has a much lower ON resistance than resistor 78.

The current threshold of comparator 60 is determined by gain control block 70 as follows. Applying Kirchhoff's voltage law to a closed loop around comparator 60 and resistors 58 and 62, it can be seen that the voltage at the inverting and non-inverting inputs of comparator 60 are equal when the voltage drop across resistor 62 equals the voltage drop across sense resistor 58. Assuming that transistor 54 is ON, transistor 55 is OFF and inductor current is ramping up, the output of comparator 60 goes HIGH when the inductor current increases to the point that the voltage drop across resistor 58 exceeds the voltage drop across resistor 62. When the output of comparator 60 goes HIGH, PWM circuitry 64 causes driver circuitry 52 to turn transistor 54 OFF and transistor 55 ON, so that inductor current starts to decrease.

The voltage drop across resistor 62 determines a current threshold of comparator 60. The current threshold of comparator 60 determines the peak inductor current in inductor 56. The current threshold of comparator 60 may be varied to adjust the peak and average inductor current as well as the output current of regulator 50. The voltage drop across resistor 62 is set by gain control block 70, which controls the current through resistor 62. Gain control block 70 can vary the current through resistor 62 in order to vary the inductor current and output current of regulator 50.

Gain control block 70 varies the current through resistor 62 and the voltage drop across resistor 62 as follows. The current through resistor 62 equals the current through n-channel transistor 74 and resistors 76 and 78 when transistor 75 is OFF (assuming the inputs of comparators 60 and 65 are high impedance nodes). Referring to FIG. 1, $V_{SHED}$ is a fixed voltage threshold at the non-inverting input of comparator 20. $V_C$ is above $V_{SHED}$ at high to moderate load currents. $V_{DIS}$ is the output voltage of comparator 20. $V_{DIS}$ therefore is LOW at high to moderate load currents and n-channel transistor 75 is OFF in all of regulators 11–13. The output of amplifier 72 is coupled to the gate of transistor 74. Amplifier 72 controls the current through transistor 74 by adjusting its output voltage. $V_C$ is coupled to the non-inverting input of amplifier 72. The output voltage of amplifier 72 varies proportionally with $V_C$. Thus, the current through transistor 74 and resistors 62, 76, and 78 varies proportionally with $V_C$.

Gain block 70 adjusts the voltage drop across resistor 62 to regulate the output current of switching regulator 50 so that it meets the load current requirements. As the load current drops, $V_{FB}$ increases and $V_C$ decreases which causes the current through resistor 62 to decrease. This causes the peak inductor current threshold of comparator 62 to decrease. The output of current comparator 60 goes HIGH sooner in each cycle so that less inductor current is sent to the load.

As the load current rises, $V_{FB}$ decreases and $V_C$ increases which causes the current through resistor 62 to increase. This causes the peak inductor current threshold of comparator 60 to increase. The inductor current ramps up to a higher level before the output of current comparator 60 goes HIGH in each cycle so that more inductor current is sent to the load.

$V_C$ varies proportionally with the load current. When $V_C$ increases, the ON time of transistor 54 momentarily increases and the ON time of transistor 55 momentarily decreases to supply more output current. When $V_C$ decreases, the ON time of transistor 54 momentarily decreases and the ON time of transistor 55 momentarily increases to supply less output current. Current comparator 60 varies the peak instantaneous inductor current through inductor 56 so that the average inductor currents of the single phase switching regulators add up to match the load current. Despite small changes in the ON times of switching transistors 54 and 55, the duty factor $D_F$ of switching transistors 54 and 55 remains almost constant as the load current changes.

Figure 3:
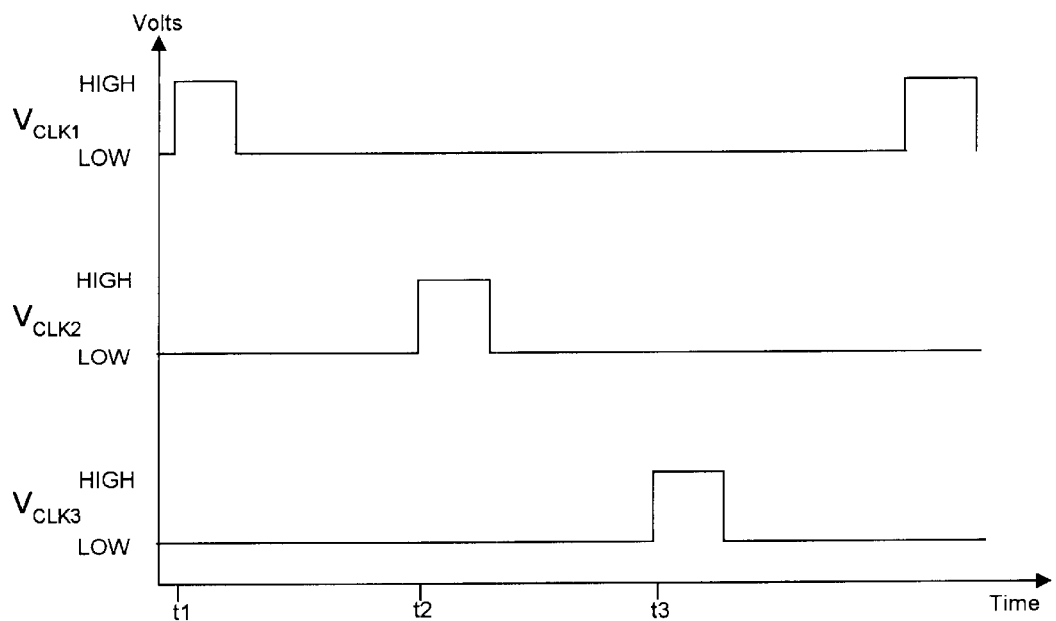
FIG. 3 is a graph of example clock signal waveforms for the multiple phase switching regulator of FIG. 1.

Each of switching regulators 11–13 provides one third of the total output current of multiple phase switching regulator 10 at high to moderate load currents. The switching of switching transistors within switching regulator circuits 11–13 is controlled by clock signals $V_{CLK1}$, $V_{CLK2}$, and $V_{CLK3}$ respectively. Example waveforms for clock signals $V_{CLK1}$, $V_{CLK2}$, and $V_{CLK3}$ are shown in FIG. 3. $V_{CLK1}$, $V_{CLK2}$, and $V_{CLK3}$ are periodic digital clock signals that have the same period. $V_{CLK1}$ goes HIGH at the start of each clock cycle, e.g., at time t1. $V_{CLK2}$ goes HIGH one-third of the way through each clock cycle, e.g., at time t2. $V_{CLK3}$ goes HIGH two-thirds of the way through each clock cycle, e.g., at time t3.

By spacing the pulses of clock signals $V_{CLK1}$, $V_{CLK2}$, and $V_{CLK3}$ equally apart as shown in FIG. 3, inductor current in each of regulators 11–13 begins to ramp up at equally spaced time intervals. For example, the following conditions are true using the example regulator shown in FIG. 2. In switching regulator 11, $V_{CLK1}$ causes transistor 54 to turn ON and transistor 55 to turn OFF at time t1. In switching regulator 12, $V_{CLK2}$ causes transistor 54 to turn ON and transistor 55 to turn OFF at time t2. In switching regulator 13, $V_{CLK3}$ causes transistor 54 to turn ON and transistor 55 to turn OFF at time t3.

Figure 4:
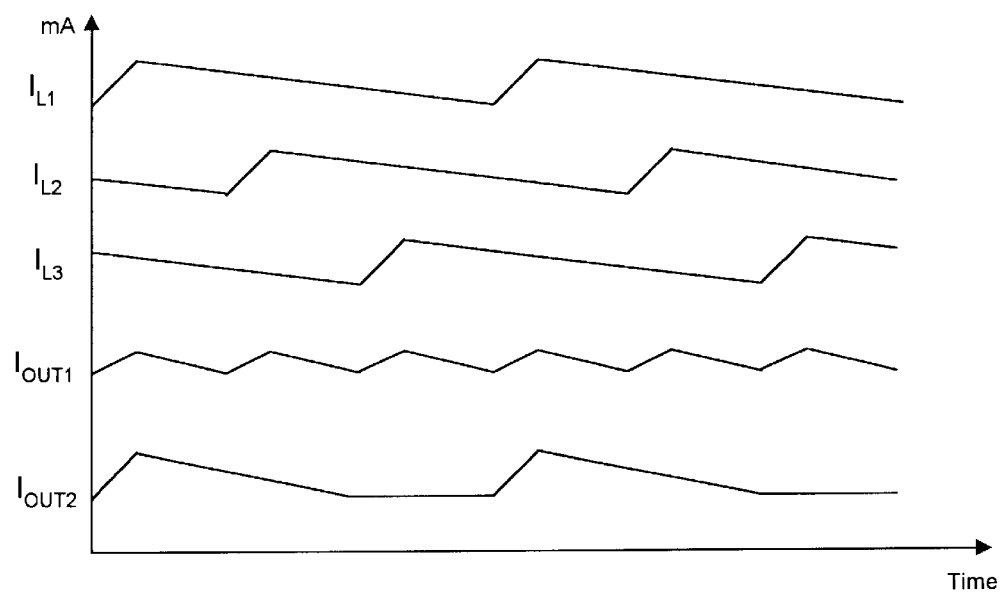
FIG. 4 is a graph of output current waveforms for the circuit of FIG. 1.

FIG. 4 illustrates example current waveforms for multiple phase switching regulator 10. Waveforms $I_{L1}$, $I_{L2}$, and $I_{L3}$ are example inductor current waveforms for switching regulators 11–13, respectively. In the example of FIG. 4, switching transistor 54 in switching regulators 11–13 may be ON during non-overlapping time intervals in each switching cycle.

$I_{OUT1}$ is an example of the toatal output current of multiple phase switching regulator 10. In FIG. 4, it can be seen that the amplitude of currents of $I_{L1}$, $I_{L2}$, and $I_{L3}$ are folded into the $I_{OUT1}$ waveform. By synchronizing the switching of switching transistors within switching regulators 11–13 to produce an output current waveform such as $I_{OUT1}$, the amplitude of the output ripple current $I_{OUT1}$ of multiple phase switching regulator 10 is substantially less than if one switching regulator supplied all of the load current. Therefore, output capacitor 22 requires less capacitance than if one switching regulator were used to supply the total load current requirement.

As the load current drops, $V_C$ also decreases. When the load current drops low enough, $V_C$ drops below $V_{SHED}$, and comparator 20 causes its output voltage $V_{DIS}$ to go HIGH. $V_{DIS}$ is coupled to the DISABLE inputs of switching regulators 12 and 13 as shown in FIG. 1. When $V_{DIS}$ is HIGH, all switching transistors (e.g., transistors 54/55) in switching regulators 12 and 13 remain OFF so that the inductor current in these switching regulators ramps down to zero and remains at zero.

For example, the DISABLE input in switching regulator 50 is coupled to driver circuitry 52 as shown in FIG. 2. When $V_{DIS}$ is HIGH, driver circuitry 52 causes switching transistors 54 and 55 to remain OFF. The present invention includes embodiments in which the switching transistors of regulators 12 and 13 are not caused to turn OFF immediately after $V_{DIS}$ goes HIGH. There may be a short delay during which one or more of the switching transistors continue to switch ON and OFF before they are caused to remain OFF by $V_{DIS}$ for the duration of low power mode. Synchronous switching transistors 54 and 55 in regulators 12–13 need not be turned OFF or disabled at the same time. Stage shedding means that switching regulator stages 12–13 are caused to be OFF by causing their switching transistors to be OFF.

The DISABLE input of switching regulator 11 is grounded so that switching regulator 11 remains ON when $V_{DIS}$ goes HIGH. Thus, when $V_{DIS}$ goes HIGH, multiple phase switching regulator 10 enters a low power mode during which switching regulator stages 12–13 are OFF and switching regulator 11 is ON. Switching regulator 11 alone supplies the output current of regulator 10 during low power mode. The low power mode improves the efficiency of regulator 10, because power is not needed to drive switching transistors in regulators 12–13 ON and OFF. The quiescent current of switching regulators 12–13 is reduced, because its switching transistors are OFF. The quiescent current drawn by regulators 12–13 may be further reduced by turning OFF or reducing the current drawn by circuitry inside these regulators such as PWM circuitry 64. An example waveform for the output current of regulator 10 in low power mode is shown as $I_{OUT2}$ in FIG. 4. The inductor current in switching regulator 11 may become discontinuous (i.e., remain at zero) between pulses in the inductor current as shown in FIG. 4.

The output of comparator 20 is also coupled to gain control circuit 70 of switching regulator 11 through its GC input. When $V_{DIS}$ goes HIGH transistor 75 turns ON and shorts resistor 78 so that substantially all of the current through resistor 76 flows through transistor 75. When transistor 75 turns ON, the current through resistors 62 and 76 increases, thereby increasing the current threshold of comparator 60. By shorting resistor 78, the net RMS (root mean square) output current of switching regulator 50 (i.e., regulator 11) increases at least three times to a level that is at or above the total net RMS output current of multiple phase switching regulator 10 just before $V_{DIS}$ went HIGH when all three switching regulators 11–13 were outputting inductor current.

The increase in the current threshold of comparator 60 when $V_{DIS}$ goes HIGH can be determined as follows. First, it can be assumed that the DC voltage at the inverting input of amplifier 72 equals $V_C$, because amplifier 72 has a high gain. Using Ohm's law, the equation for the voltage drop across resistors 76 and 78 when transistor 75 is OFF, can be set equal to the equation for the voltage drop across resistor 76 when transistor 75 is ON to derive the following equation:

$$\frac{I_2}{I_1} = \frac{R_{76} + R_{78}}{R_{76}} \quad (1)$$

where $R_{76}$ is the resistance of resistor 76, $R_{78}$ is the resistance of resistor 78, $I_1$ is the current through resistors 76 and 78 when transistor 75 is OFF, and $I_2$ is the current through resistor 76 and transistor 75 when transistor 75 is ON. Therefore, the voltage drop across resistor 62 increases by the same ratio when transistor 75 turns ON as shown by the following equation:

$$V_{R62B} = V_{R62A}\left(\frac{R_{76} + R_{78}}{R_{76}}\right) \quad (2)$$

where $V_{R62A}$ is the voltage drop across resistor 62 when $V_{DIS}$ is LOW, and $V_{R62B}$ is the voltage drop across resistor 62 when $V_{DIS}$ is HIGH.

Preferably, the voltage drop across resistor 62 increases enough when transistor 75 turns ON such that the net RMS output current of switching regulator 11 after $V_{DIS}$ goes HIGH is greater than the net RMS output current of switching regulators 11–13 together just before $V_{DIS}$ went HIGH. By supplying a greater RMS output current of switching regulator 11 alone at low load currents, hysteresis is introduced into the control loop of switching regulator 10. The hysteresis causes switching regulator 11 to supply more output current than required by the load at low load currents when $V_{DIS}$ is HIGH. The increased output current from switching regulator 11 causes $V_C$ to decrease further below $V_{SHED}$, and thus keeps multiple phase switching regulator 10 in the low power mode with switching regulators 12–13 kept OFF for a longer period of time.

The hysteresis added by setting a higher resistor ratio than needed to maintain $V_{OUT}$ may be considered as setting two different load current threshold levels. The load current threshold at which regulator 10 enters low power mode is less than the load current threshold at which regulator 10 exits low power mode. For example, if $R_{76}$ equals $R_{78}$, then the voltage drop across resistor 62 increases by a factor of 2 when transistor 75 turns ON. The voltage drop across resistor 62 need only increase by a factor of 1.73 (i.e., √3) for switching regulator 11 to provide enough net RMS output current to supply the load by itself due to the relationship of peak to RMS current in the discontinuous mode. By increasing the voltage drop across resistor 62 by a factor of 2, more output current is supplied to output capacitor 22 than required by the load in order to prolong the low power mode. Regulator 10 therefore remains in low power mode up to a higher load current level than the load current level at which it entered low power mode. Hysteresis further improves the efficiency of multiple phase regulator 10.

Regulator 10 exits low power mode as follows. Eventually, the load current rises enough such that switching regulator 11 cannot supply the load current by itself. As the load current rises, $V_C$ rises until it increases above $V_{SHED}$, causing switching regulators 12–13 to be ON again and conduct output current. Also, transistor 75 turns OFF again so that the current threshold of switching regulator 11/50 is reduced by the ratio shown in equation (2).

When multiple phase switching regulator 10 enters low power mode, the amplitude of the output current of regulator 10 increases, because all of the output current of regulator 10 is supplied by switching regulator 11 (e.g., waveform $I_{OUT2}$ of FIG. 4). Regulator 10 preferably enters low power mode after its minimum instantaneous output current has reached zero, as shown, e.g., by waveform $I_{OUT2}$. This helps ensure that the load current is small enough in low power mode that the amplitude of the output current ripple of regulator 10 is not undesirably large. If the amplitude of the output current ripple is larger in low mode than its maximum value in normal mode, output capacitor 22 must have a larger capacitance to provide the same amount of filtering of the output current and $V_{OUT}$. Therefore, the RMS amplitude of the output current ripple of regulator 10 in low power mode should not be substantially larger than the maximum RMS amplitude of the output current ripple in normal mode in order to maintain the same size capacitor 22.

Similar considerations also apply for the input capacitor coupled to $V_{IN}$. An input capacitor 53 is coupled to $V_{IN}$ as shown in FIG. 2. Prior to the onset of low power mode, the input current ripple in multiple phase switching regulator 10 is spread out over the switching cycle, because input current goes to all three switching regulators 11–13 preferably at different times. When regulator 10 enters low power mode, the amplitude of the input current increases, because all of the input current is delivered to switching regulator 11 in a fraction of the switching cycle. If the amplitude of the input current in low power mode is larger than its largest value in normal mode, the input capacitance must be increased to provide the same amount of input current and $V_{IN}$ filtering. Therefore, the low power mode threshold $V_{SHED}$ should be set at a level that ensures that the amplitude of the input RMS current in low power mode does not increase substantially above its maximum RMS value in normal mode.

Figure 5:
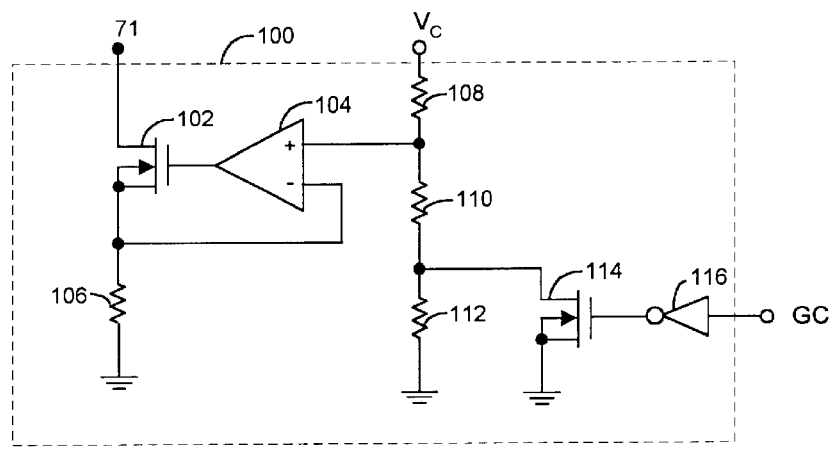
FIG. 5 is a graph of an exemplary gain control circuit in accordance with the principles of the present invention.
Figure 6A:
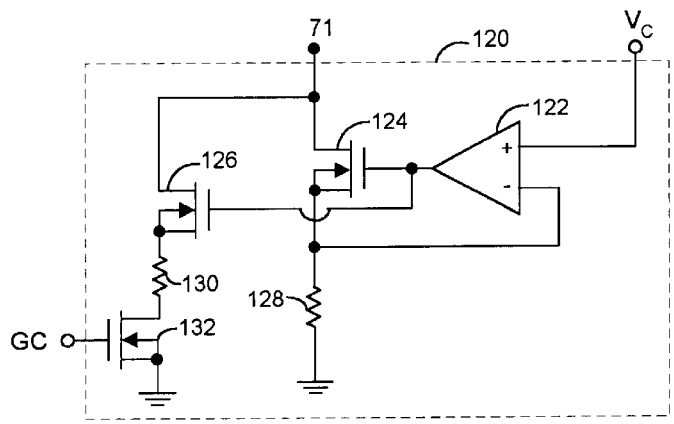
FIG. 6A–6B are schematic diagrams of additional exemplary gain control circuits in accordance with the principles of the present invention.
Figure 6B:
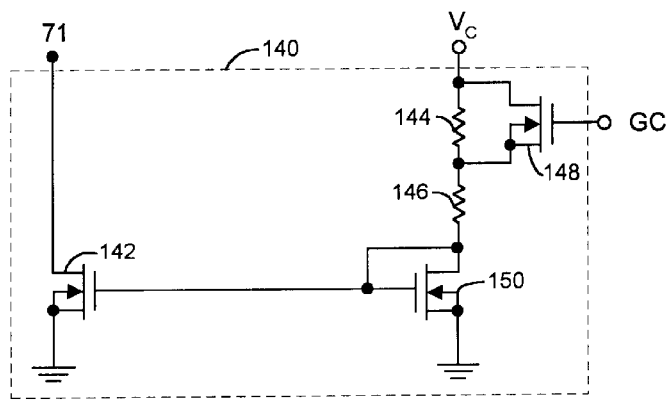

Further examples of gain control circuits are shown in FIGS. 5 and 6A–6B. Any of gain control circuits 100, 120, and 140 may replace gain control circuit 70 of FIG. 2. Any of gain control circuits 100, 120, and 140 may be coupled to comparator 60 of switching regulator 50 at node 71 in place of gain control circuit 70. Referring to FIG. 5, gain control circuit 100 includes inverter 116, MOSFETs 102 and 114, amplifier 104, and resistors 106, 108, 110, and 112. During normal mode, current flows from $V_C$ through resistors 108 and 110 and MOSFET 114 to ground. MOSFET 114 shorts resistor 112, because the GC input is grounded in regulators 12–13 and $V_{DIS}$ is zero.

The voltage at the non-inverting input of amplifier 104 is determined by the resistor divider formed by resistors 108 and 110 and $V_C$ (the output voltage of transconductance amplifier 18). Amplifier 104 varies the current through MOSFET 102 and resistor 106 in response to changes in the voltage at its non-inverting input. The current through MOSFET 102 equals the current through resistor 62 in regulator 50. Therefore, gain control circuit 100 varies the current threshold of regulator 50 in response to changes in $V_C$ to regulate $V_{OUT}$, as with gain control 70.

The GC input of switching regulator 11 is coupled to $V_{DIS}$ as shown in FIG. 1. When $V_{DIS}$ goes HIGH at the onset of low power mode, the gate of MOSFET 114 goes LOW and MOSFET 114 turns OFF in regulator 11. Current now flows from $V_C$ through resistors 108, 110, and 112 to ground. The voltage at the non-inverting input of amplifier 104 is now determined by the resistor divider formed by resistors 108, 110, and 112. The voltage across resistor 62, which determines the current threshold of regulator 50, increases when $V_{DIS}$ goes HIGH according to the following equation:

$$\frac{V_{R62B}}{V_{R62A}} = \frac{(R_{110} + R_{112})(R_{108} + R_{110})}{R_{110}(R_{108} + R_{110} + R_{112})} \quad (3)$$

where $V_{R62A}$ is the voltage drop across resistor 62 when $V_{DIS}$ is LOW, $V_{R62B}$ is the voltage drop across resistor 62 when $V_{DIS}$ is HIGH, $R_{108}$ is the resistance of resistor 108, $R_{110}$ is the resistance of resistor 110, and $R_{112}$ is the resistance of resistor 112. The current threshold of regulator 11 increases when $V_{DIS}$ goes HIGH to supply the load current.

Referring now to FIG. 6A, gain control circuit 120 includes amplifier 122, MOSFET 124, MOSFET 126, MOSFET 132, and resistors 128 and 130. In normal mode when $V_{DIS}$ is LOW, MOSFET 132 is OFF in all of regulators 11–13, and no current flows through resistor 130 and MOSFET 126. The current that flows through resistor 62 equals the current that flows through resistor 128 in normal mode. $V_C$ is coupled to the non-inverting input of amplifier 122. Amplifier 122 varies the current through MOSFET 124 and resistor 62 in response to $V_C$ to regulate $V_{OUT}$.

The GC input is coupled to MOSFET 132. When $V_{DIS}$ goes HIGH at the start of low power mode, MOSFET 132 turns ON in regulator 11 and current now flows through MOSFETs 126 and 132 and resistor 130 to ground. Resistors 130 and 128 are now coupled in parallel, which causes the total current through both resistors to increase. The current through resistor 62 now equals the current through resistor 130 plus the current through resistor 128. The current through resistor 128 is constant when $V_{DIS}$ goes HIGH (assuming $V_C$ does not change). Therefore, the current through MOSFETs 126/132 and resistor 130 equals the increase in the current through resistor 62. The current threshold of regulator 11 increases when $V_{DIS}$ goes HIGH by a ratio that is determined by the current through resistor 130. The resistance of resistor 130 is selected so that the current threshold of regulator 11 increases enough to supply the load current and regulate $V_{OUT}$ in low power mode, according to the following equation:

$$\frac{V_{R62B}}{V_{R62A}} = \frac{R_{130}}{R_{130} + R_{128}} \quad (4)$$

where $R_{130}$ is the resistance of resistor 130, and $R_{128}$ is the resistance of resistor 128. In low power mode, amplifier 122 varies the current through MOSFETs 126 and 124 in response to changes in $V_C$.

Referring now to FIG. 6B, gain control circuit 140 includes MOSFET 142, MOSFET 148, MOSFET 150, and resistors 144 and 146. The GC input is coupled to MOSFET 148. In normal mode, $V_{DIS}$ is LOW and MOSFET 148 is OFF in all of regulators 11–13. The gates of MOSFETs 142 and 150 are coupled together to form a current mirror. The ratio of the gate length-to-width areas of MOSFET 142 to MOSFET 150 equals the ratio of the current through MOSFET 142 to the current through MOSFET 150. The current through MOSFET 142 equals the current through resistor 62 in regulator 50. The currents through MOSFETs 150 and 142 are proportional to $V_C$. Therefore, $V_C$ sets the current threshold of regulators 11–13.

In low power mode, $V_{DIS}$ goes HIGH and MOSFET 148 turns ON shorting resistor 144 in regulator 11. The current through MOSFETs 142 and 150 now increases. The voltage drop across resistor 62 also increases, according to the following equation:

$$\frac{V_{R62B}}{V_{R62A}} = \frac{(R_{144} + R_{146})(V_C - V_{GSB})}{R_{146}(V_C - V_{GSA})} \quad (5)$$

where $R_{144}$ is the resistance of resistor 144, $R_{146}$ is the resistance of resistor 146, $V_{GSA}$ is the gate-to-source voltage of MOSFET 150 when MOSFET 148 is OFF, and $V_{GSB}$ is the gate-to-source voltage of MOSFET 150 when MOSFET 148 is ON. The gate-to-source voltage of MOSFET 150 increases when MOSFET 148 turns ON creating a non-linear relationship between $V_{R62A}$ and $V_{R62B}$ as shown by equation (5).

In the present application, two circuit elements are considered "coupled" when an energy transfer path exists between them, even if the two circuit elements are not directly connected together. For example, current mirror 142/150 is coupled to amplifier 18 through resistor 146 and resistor 144 (or transistor 148).

In further embodiments of the present invention, any number of additional single phase switching regulators may be added to multiple phase switching regulator 10. For example, multiple phase switching regulators of the present invention may have four single phase switching regulators coupled in parallel between the input voltage and the load. Three of the single phase switching regulators in this embodiment may be OFF when the load current falls below the $V_{SHED}$ threshold, so that the remaining switching regulator supplies all of the load current in low power mode.

Figure 7:
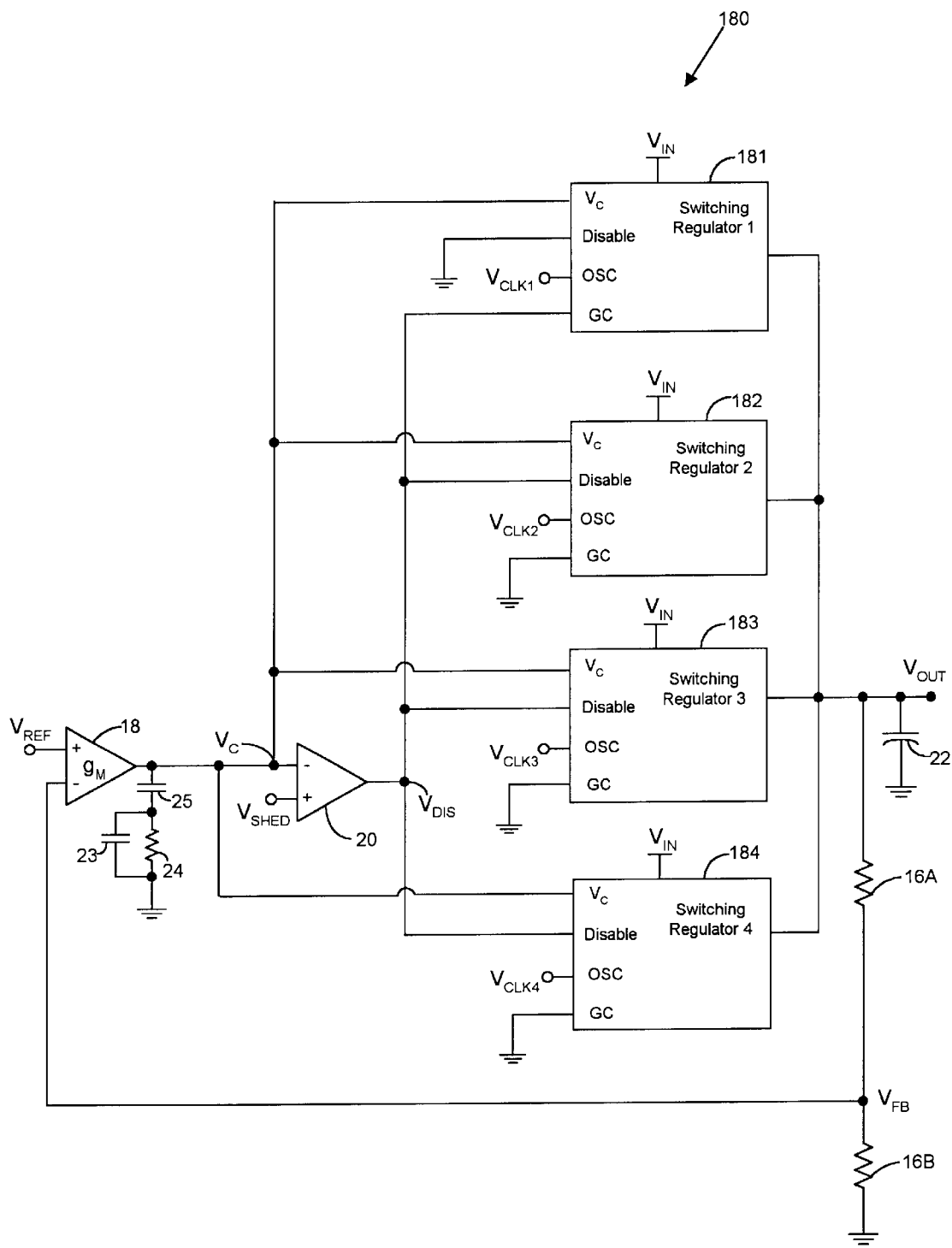
FIG. 7 is a schematic of a four stage high-efficiency multiple phase switching regulator in accordance with the principles of the present invention.

An example of the four switching regulator embodiment is illustrated in FIG. 7. Multiple phase switching regulator 180 includes single phase current-mode switching regulators 181–184, low load comparator 20, transconductance amplifier 18, output capacitor 22, resistor divider 16A/16B, resistor 24, and capacitors 23 and 25. Capacitor 22 and resistors 16A and 16B and other circuitry in switching regulators 181–184 may be external to an integrated circuit.

Switching regulator 50 in FIG. 2 is an example of switching regulators 181–184. The switching of regulators 181–184 is controlled by clock signals $V_{CLK1}$, $V_{CLK2}$, $V_{CLK3}$ and $V_{CLK4}$, which preferably have clock pulses that are equally spaced at one quarter intervals of the clock period to minimize the amplitude of the output ripple current. When $V_{DIS}$ goes HIGH, switching regulators 182–184 are OFF, and switching regulator 181 supplies all of the output current of multiple phase regulator 180. The resistor ratio in equation (2) is set so that when $V_{DIS}$ goes HIGH, the net RMS output current of switching regulator 181 increases by at least four fold.

In a further embodiment of the present invention that includes three or more single phase switching regulators, two or more of the single phase switching regulators may be ON in low power mode to supply the load current. A gain control circuit such as gain control circuit 70 (with or without hysteresis) may be present in each switching regulator that is ON in low power mode to adjust their current thresholds when changing between normal and low power mode. In a further embodiment, the multiple phase switching regulator may have one gain control circuit that controls the current threshold of the two or more single phase switching regulators that remain ON in low power mode.

In another embodiment of the present invention, each of the single phase switching regulators coupled in parallel may have their own separate feedback loop circuitry including, for example, an error amplifier that varies the output current only through that single phase switching regulator. One of these feedback loops or a separate feedback loop is coupled to the low load comparator to indicate when the load current has fallen below the threshold of the low load comparator.

Figure 8:
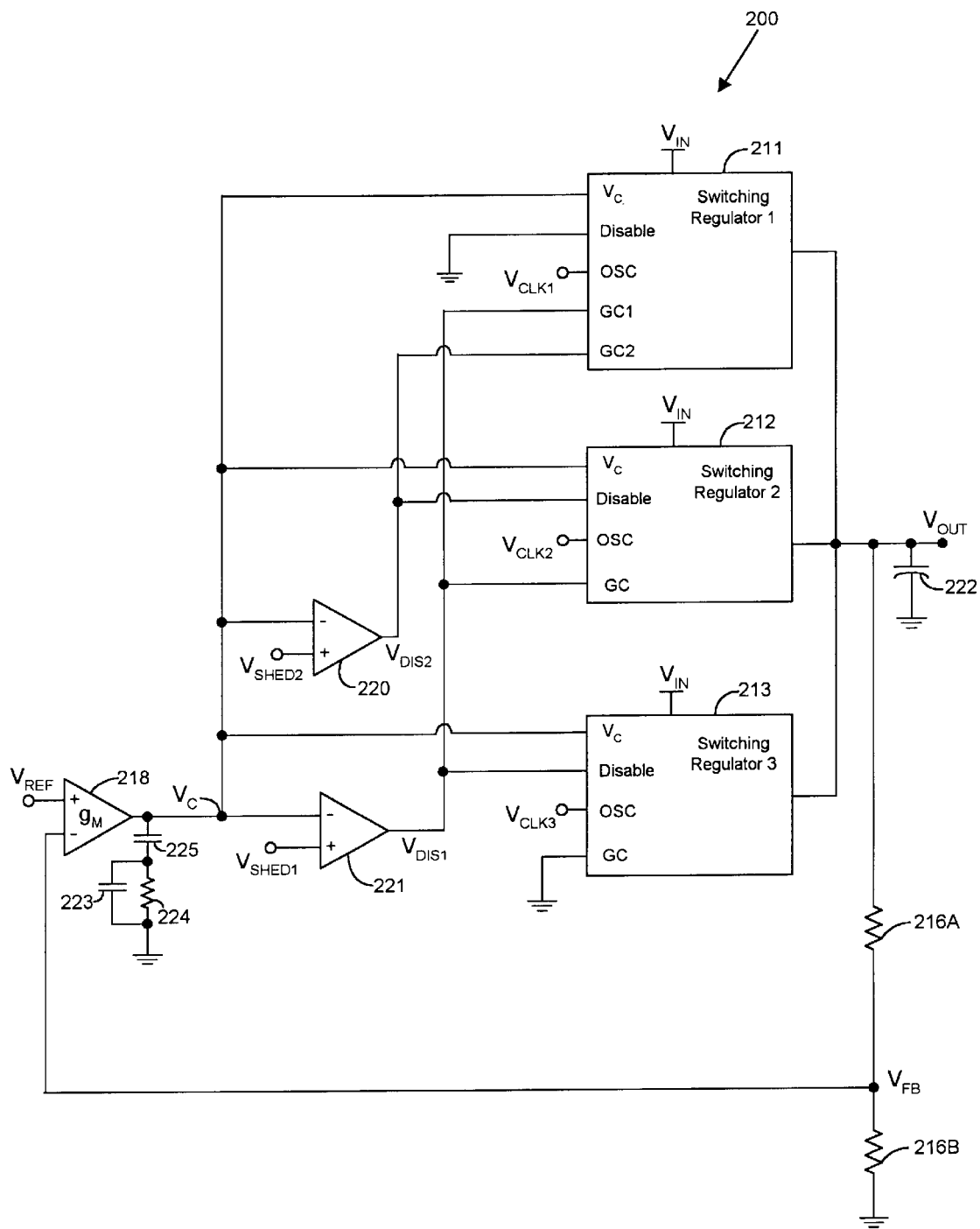
FIG. 8 is a schematic of alternative embodiment of a three stage high-efficiency multiple phase switching regulator in accordance with the principles of the present invention.

Multiple phase switching regulators of the present invention may include a plurality of single phase switching regulators coupled in parallel and a plurality of low power modes. An example of such an embodiment of the present invention is illustrated in FIG. 8. Multiple phase switching regulator 200 in FIG. 8 has three single phase switching regulator circuits coupled in parallel, and operates in three modes of operation: a normal mode at high to moderate load currents, a first low power mode at low load currents, and a second low power mode at very low load currents. In normal mode, all three switching regulators are ON. In the first low power mode, two switching regulators are ON and one switching regulator is OFF. In the second low power mode, one switching regulator is ON and two switching regulators are OFF. The first and second low power modes increase efficiency of the multiple phase regulator at low load currents.

Multiple phase switching regulator 200 includes three current-mode, single phase, switching regulator circuits 211–213 coupled in parallel, low load voltage comparators 220 and 221, transconductance amplifier 218, resistors 216A/216B and 224, and capacitors 222, 223, and 225. All three switching regulators 211–213 provide output current to a load coupled to output capacitor 222 at high to moderate load currents. Resistor divider 216A/216B provides a voltage feedback signal $V_{FB}$ to transconductance amplifier 218. Capacitors 223 and 225 and resistor 224 provide frequency compensation for the feedback loop. Output capacitor 222 and resistors 216A and 216B may be external to an integrated circuit.

The output voltage $V_C$ of amplifier 218 is provided at the $V_C$ input of switching regulators 211–213. Switching regulator 50 in FIG. 2 is an example of each of switching regulators 212–213. Regulators 212–213 may also comprise other standard switching regulator configurations. Output voltage $V_C$ varies the current threshold of current comparator 60 for regulators 212–213 to regulate $V_{OUT}$ as discussed above with respect to FIG. 2. As $V_C$ varies proportionally with the load current, switching regulators 211–213 vary their inductor currents so as to regulate $V_{OUT}$ and supply the load current.

Figure 9:
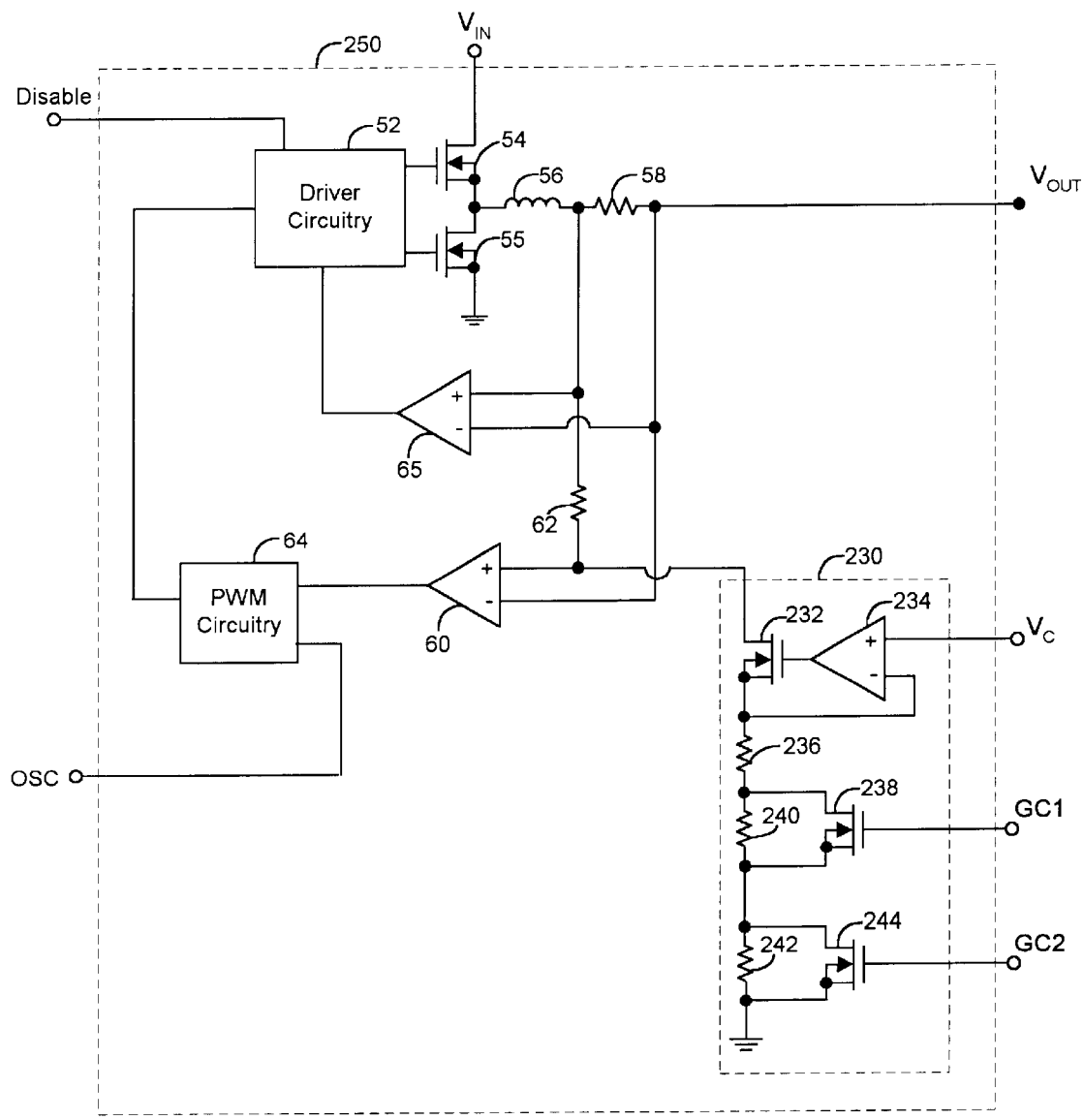
FIG. 9 is a schematic diagram of an additional exemplary synchronous switching regulator in accordance with the principles of the present invention.

Switching regulator 250 shown in FIG. 9 is an example of switching regulator 211. Regulator 211 may also comprise other switching regulator configurations. Gain control circuit 230 controls the output current of regulator 250. Gain control circuit 230 includes amplifier 234, MOSFET 232, MOSFET 238, MOSFET 244, and resistors 236, 240, and 242. The current through MOSFET 232 sets the voltage drop across resistor 62 in regulator 250. The current through MOSFET 232 is controlled by amplifier 234. As the load current increases, $V_C$ causes amplifier 234 to increase the current through MOSFET 232. The voltage drop across resistor 62 then increases so that the inductor current in regulator 250 increases. As the load current decreases, $V_C$ causes amplifier 234 to decrease the current through MOSFET 232. The voltage drop across resistor 62 then decreases so that the inductor current of regulator 250 decreases.

When the load current drops to a first threshold level set by $V_{SHED1}$, multiple phase switching regulator 200 enters a first low power mode in which switching regulator 213 is OFF and switching regulators 211–212 are ON. $V_{DIS1}$ is coupled to the DISABLE input of regulator 213. When $V_C$ drops below $V_{SHED1}$, the output voltage $V_{DIS1}$ of comparator 221 goes HIGH, causing switching transistors within switching regulator 213 to remain OFF so that regulator 213 supplies no output current. $V_{DIS1}$ is also coupled to GC input of regulator 212 and the GC1 input of regulator 211. When $V_{DIS1}$ goes HIGH, switching regulators 211–212 remain ON and increase their peak and average inductor currents to compensate for the fact that regulator 213 is now OFF.

$V_{DIS1}$ is coupled to the gate of transistor 75 in gain control 70 of switching regulator 212. When $V_{DIS1}$ goes HIGH, transistor 75 shorts resistor 78 to ground to increase the current threshold of comparator 60 in regulator 50/212 as discussed above with respect to FIG. 2. The resistor ratio shown in equation (2) is set to increase the voltage drop across resistor 62 so that the output current of switching regulator 212 increases. For example, the output current of regulator 212 may increase from one-third of the load current to one-half of the load current.

Also when $V_{DIS1}$ goes HIGH at a low load current, transistor 238 in gain control 230 of FIG. 9 turns ON and shorts resistor 240. The voltage drop across resistor 62 in regulator 211 now increases. For example, the output current of regulator 211 may increase from one third of the load current to one half of the load current. Regulators 211 and 212 provide the total output current of multiple phase regulator 200 in the first low power mode.

Transistor 244 is OFF in the first low power mode. The voltage drop across resistor 62 in regulator 211 now increases according to the following equation derived from Ohm's law:

$$V_{R62B} = V_{R62A} \frac{R_{236} + R_{240} + R_{242}}{R_{236} + R_{242}} \quad (6)$$

where $V_{R62A}$ is the voltage drop across resistor 62 in regulator 211 when $V_{DIS1}$ is LOW, $V_{R62B}$ is the voltage drop across resistor 62 in regulator 211 when $V_{DIS1}$ is HIGH, $R_{236}$ is the resistance of resistor 236, $R_{240}$ is the resistance of resistor 240, and $R_{242}$ is the resistance of resistor 242.

Thus, when $V_{DIS1}$ goes HIGH multiple phase switching regulator 200 enters a first low power mode in which regulator 213 is OFF, and regulators 211 and 212 are ON supplying current to the load. The current threshold of resistor 62 in regulator 211 increases by the resistor ratio of equation (6), and the current threshold of resistor 62 in regulator 212 increases by the resistor ratio of equation (2). The resistor ratio shown in equations (2) and (6) are selected so that the total output current of regulators 211 and 212 supply the load current in the first low power mode and $V_{OUT}$ remains at a regulated value.

When the load current drops below a second threshold $V_{SHED2}$, multiple phase switching regulator 200 enters a second low power mode in which switching regulators 212 and 213 are OFF and switching regulator 211 alone supplies all of the load current and regulates $V_{OUT}$. Threshold $V_{SHED2}$ sets a lower load current threshold than $V_{SHED1}$. Thus, as the load current decreases, $V_C$ first decreases to $V_{SHED1}$ and then to $V_{SHED2}$ as the load current continues to drop. When $V_C$ reaches $V_{SHED2}$, the output voltage $V_{DIS2}$ of low load comparator 220 goes HIGH. $V_{DIS2}$ is coupled to the DISABLE input of switching regulator 212 as shown in FIG. 8.

When $V_{DIS2}$ is HIGH, switching transistors (e.g., transistors 54 and 55) in switching regulator 212 remain OFF so that regulator 212 supplies no output current. The disable input of regulator 50/212 may be coupled to the driver circuitry, as shown for example in FIG. 2, which disables the switching transistors when $V_{DIS2}$ goes HIGH. The present invention includes embodiments in which the switching transistors of regulators 212–213 are not caused to switch OFF immediately after $V_{DIS1}$ or $V_{DIS2}$ goes HIGH. There may be a short delay during which one or more of the switching transistors continue to switch ON and OFF before they are caused to remain OFF by $V_{DIS1}$ or $V_{DIS2}$ for the duration of the second low power mode. Synchronous switching transistors 54 and 55 in regulator 212 need not be turned OFF or disabled simultaneously.

$V_{DIS2}$ is also coupled to gain control circuit 230 through the GC2 input of switching regulator 211. Referring again to FIG. 9, transistor 244 turns ON when $V_{DIS2}$ goes HIGH, shorting resistor 242. At this point in time, transistor 238 is already ON shorting resistor 240 as discussed above. When transistor 244 turns ON, the voltage drop across resistor 62 in regulator 211 increases so that the current threshold of comparator 60 increases according to the following equation:

$$V_{R62C} = V_{R62B}\left(\frac{R_{236} + R_{242}}{R_{236}}\right) \quad (7)$$

where $V_{R62C}$ is the voltage drop across resistor 62 in regulator 211 when $V_{DIS1}$ and $V_{DIS2}$ are both HIGH.

When $V_{DIS2}$ is HIGH, regulators 212 and 213 are OFF, and switching regulator 211 supplies 100% of the output current of multiple phase switching regulator 200. The resistor ratio shown in equation (7) is selected so that the total output current of regulator 211 supplies the load current in the second low power mode and $V_{OUT}$ remains at a regulated value. The resistor ratio shown in equation (7) may be increased so that the current threshold is higher than needed to match the load current in order to add hysteresis into the control loop in the second low power mode.

Figure 10:
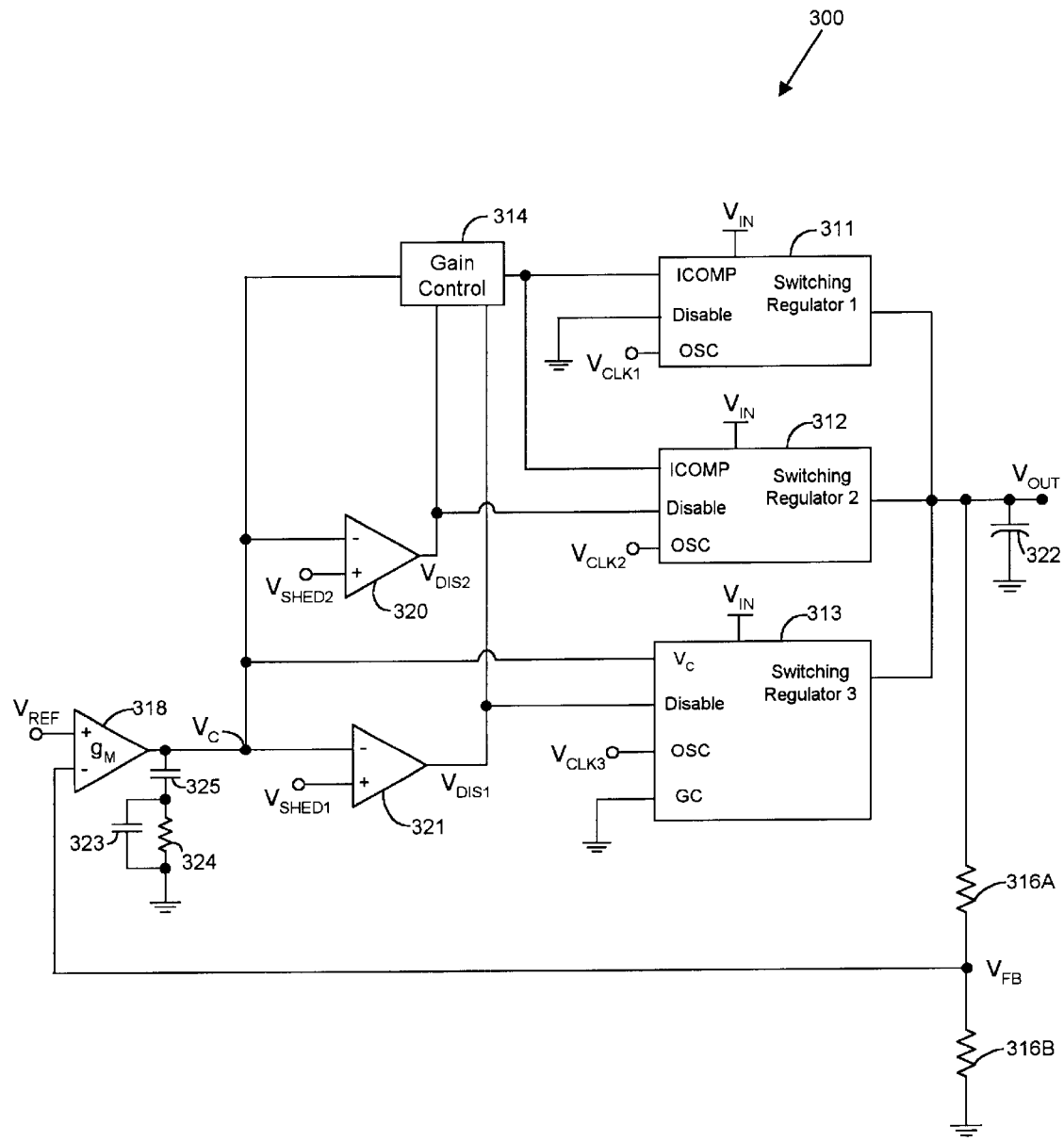
FIG. 10 is a schematic of another embodiment of a three stage high-efficiency multiple phase switching regulator in accordance with the principles of the present invention.

Multiple phase switching regulators of the present invention may include a single gain control block and a plurality of low power modes. An example of such an embodiment of the present invention is illustrated in FIG. 10. Multiple phase switching regulator 300 includes three current-mode, single phase, switching regulator circuits 311–313 coupled in parallel, low load voltage comparators 320 and 321, gain control circuit 314, transconductance amplifier 318, resistors 316A/316B and 324, and capacitors 322, 323, and 325. All three switching regulators 311–313 provide output current to a load coupled to output capacitor 322 at high to moderate load currents. Resistor divider 316A/316B provides a voltage feedback signal $V_{FB}$ to transconductance amplifier 318. Capacitors 323 and 325 and resistor 324 provide frequency compensation for the feedback loop. Output capacitor 322 and resistors 316A and 316B may be external to an integrated circuit.

Multiple phase switching regulator 300 in FIG. 10 operates in three modes of operation: a normal mode at high to moderate load currents, a first low power mode at low load currents, and a second low power mode at very low load currents. In normal mode, all three switching regulators 311–313 are ON. In the first low power mode, switching regulators 311–312 are ON and switching regulator 313 is OFF. In the second low power mode, switching regulator 311 is ON and switching regulators 312–313 are OFF. The first and second low power modes increase efficiency of the multiple phase regulator at low load currents.

Switching regulator 50 in FIG. 2 is an example of switching regulator 313. Switching regulator 313 may comprise other switching regulator configurations. Output voltage $V_C$ provides a variable threshold for current comparator 60 of regulator 313 to regulate $V_{OUT}$ as discussed above with respect to FIG. 2. $V_C$ is also provided to gain control circuit 314. $V_C$ sets a variable threshold for current comparators within regulators 311–313. As $V_C$ varies proportionally with the load current, switching regulators 311–313 vary their inductor currents so as to regulate $V_{OUT}$ and supply the load current.

Figure 11:
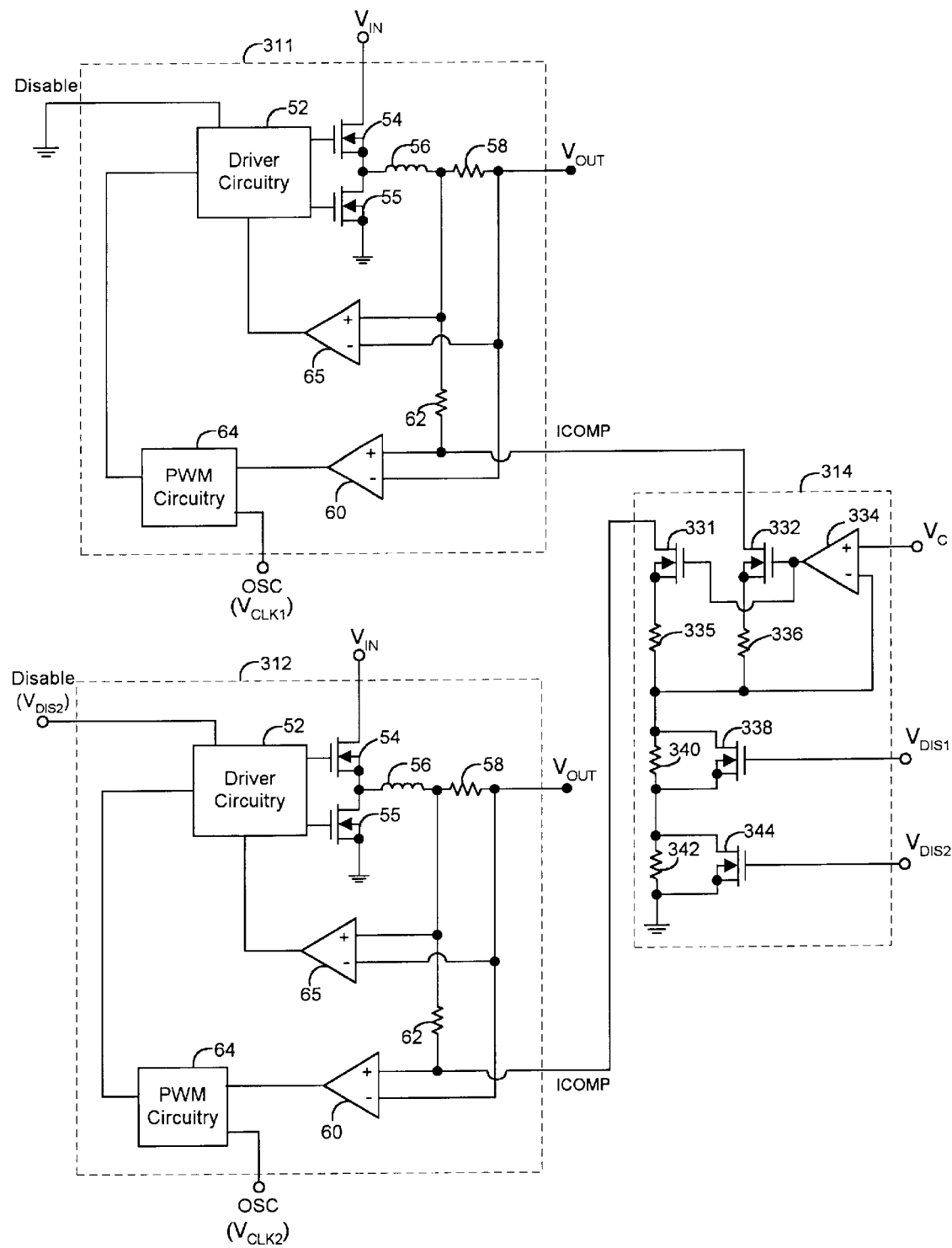
FIG. 11 is a schematic diagram of other exemplary switching regulators and a gain control circuit in accordance with the principles of the present invention.

Examples of switching regulators 311–312 are shown in detail in FIG. 11. Regulators 311 and 312 may also comprise other switching regulator configurations. Gain control circuit 314 includes n-channel FETs 331, 332, 338, and 344; amplifier 334; and resistors 335, 336, 340, and 342. The drain of FET 331 is coupled to the ICOMP input of switching regulator 312, and the drain of FET 332 is coupled to the ICOMP input of switching regulator 311. The current through resistor 62 in regulator 312 equals the current through FET 331 and resistor 335. The current through resistor 62 in regulator 311 equals the current through FET 332 and resistor 336. Amplifier 334, which is responsive to $V_C$, controls the current through FETs 331 and 332 and the voltage drop across resistors 62 in regulators 311–312.

At the onset of the first low power mode, $V_{DIS1}$ goes HIGH causing n-channel MOSFET 338 to turn ON shorting resistor 340. The voltage drop across resistors 62 in regulators 311 and 312 increases to supply the load current. Switching regulator 313 is OFF and switching regulators 311 and 312 are ON in the first low power mode. At the onset of the second low power mode, $V_{DIS2}$ goes HIGH causing n-channel MOSFET 344 to turn ON shorting resistor 342. The voltage drop across resistor 62 in regulator 311 increases to supply the load current. Switching regulators 313 and 312 are OFF and switching regulator 311 is ON in the second lower power mode.

Further embodiments of the present invention, may include any number of single phase switching regulators and any number of low power modes. For example, multiple phase switching regulators of the present invention may have four single phase switching regulators coupled in parallel and one, two, or, three low power modes. For example, a four switching regulator embodiment may have a first low power mode in which one switching regulator is OFF, a second low power at a lower load current in which two switching regulators are OFF, and a third low power mode at an even lower load current in which three switching regulators are OFF.

Alternatively, a four switching regulator embodiment may have a first low power mode in which one switching regulator is OFF, and a second low power mode at a lower load current in which two or three switching regulators are OFF. A four switching regulator embodiment may also have a first low power mode in which two switching regulators are OFF, and a second low power mode at a lower load current in which three switching regulators are OFF. Additional low power modes come at the expense of added circuitry. In still another embodiment of the present invention, each single phase switching regulator may be coupled to a separate input voltage source.

Figure 12:
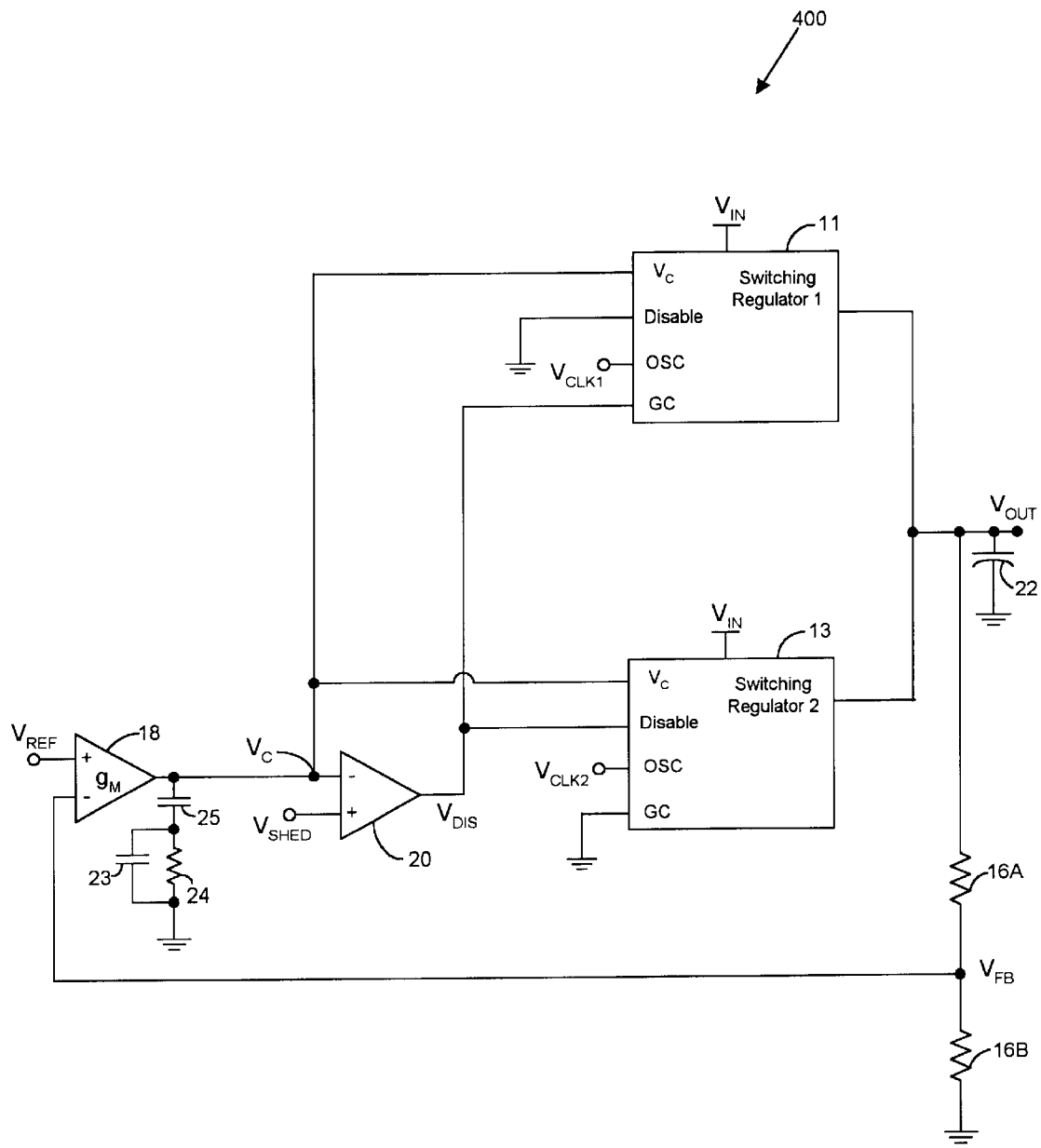
FIG. 12 is a schematic of a two stage high-efficiency multiple phase switching regulator in accordance with the principles of the present invention.

In a further embodiment of the present invention, a multiple phase switching regulator may include only two single phase switching regulators as shown in FIG. 12. Multiple phase switching regulator 400 in FIG. 12 has two single phase switching regulators 11 and 13 coupled in parallel to output capacitor 22. Switching regulator 13 is OFF at low load current, and switching regulator 11 supplies all of the load current in a low power mode. FIG. 2 illustrates an example of switching regulators 11 and 13, as discussed above. The other elements of regulator 400 operate as discussed above with respect to FIG. 1.

Persons skilled in the art further will recognize that the circuitry of the present invention may be implemented using circuit configurations other than those shown and discussed above. All such modifications are within the scope of the present invention, which is limited only by the claims which follow.

What is claimed is:

1. A multiple phase switching regulator, comprising:
    a plurality of single phase switching regulators coupled to an output; and
    a first comparator coupled to a feedback loop circuit that prevents a first one of the single phase switching regulators from providing output current to a load coupled to the output after the load current drops below a threshold of the first comparator, wherein at least a second one of the single phase switching regulators comprises:
        a first gain control circuit coupled to the first comparator that causes the output current of the second single phase switching regulator to increase after the load current drops below the threshold of the first comparator.

2. The multiple phase switching regulator of claim 1 wherein the feedback loop further comprises:
    a first amplifier coupled to a resistor divider and at least one of the single phase switching regulators.

3. The multiple phase switching regulator of claim 2 wherein the first amplifier is coupled to each of the single phase switching regulators.

4. The multiple phase switching regulator of claim 1 wherein the plurality of single phase switching regulators comprises three single phase switching regulators.

5. The multiple phase switching regulator of claim 4 wherein the first comparator prevents two of the single phase switching regulators from outputting current to the load when the load current drops below the threshold of the first comparator.

6. The multiple phase switching regulator of claim 1 wherein the plurality of single phase switching regulators comprises four single phase switching regulators.

7. The multiple phase switching regulator of claim 6 wherein the first comparator prevents three of the single phase switching regulators from outputting current to the load when the load current drops below the threshold of the first comparator.

8. The multiple phase switching regulator of claim 6 wherein the first comparator prevents two of the single phase switching regulators from outputting current to the load when the load current drops below the threshold of the first comparator.

9. The multiple phase switching regulato of claim 1 wherein the plurality of single phase switching regulators are synchronous switching regulators.

10. The multiple phase switching regulator of claim 1 wherein the first gain control circuit comprises:
    an amplifier coupled to the feedback loop circuit that increases a current threshold of the second single phase switching regulator.

11. The multiple phase switching regulator of claim 1 wherein the first gain control circuit further comprises:
    a resistor; and
    a transistor coupled to the resistor and the first comparator, wherein the transistor shorts the resistor when the load current drops below the threshold of the first comparator.

12. The multiple phase switching regulator of claim 1 further comprising:
   a second comparator coupled to the feedback loop circuit that prevents the second single phase switching regulator from outputting current to the load when the load current drops below a threshold of the second comparator that is less than the threshold of the first comparator.

13. The multiple phase switching regulator of claim 12 wherein at least a third one of the single phase switching regulators comprises:
   a second gain control circuit coupled to the second comparator that causes the output current of the third single phase switching regulator to increase after the load current falls below the threshold of the second comparator.

14. The multiple phase switching regulator of claim 13 wherein the second gain control circuit comprises further comprises:
   a resistor; and
   a transistor coupled to the resistor and the second comparator, wherein the transistor shorts the resistor when the load current drops below the threshold of the second comparator.

15. The multiple phase switching regulator of claim 1 wherein the first gain control circuit further comprises:
   a resistor divider; and
   a transistor coupled to the resistor divider and the first comparator, wherein the transistor shorts a resistor in the resistor divider when the load current is below the threshold of the first comparator.

16. The multiple phase switching regulator of claim 1 wherein the first gain control circuit further comprises:
   first and second resistors coupled in parallel such that current flows through both resistors after the load current drops below the threshold of the first comparator.

17. The multiple phase switching regulator of claim 1 wherein the first gain control circuit comprises:
   a resistor coupled to the feedback loop circuit;
   a current mirror circuit coupled to the resistor and the second single phase switching regulator, wherein the current mirror adjusts the output current of the second single phase switching regulator.

18. A method for supplying current from a multiple phase switching regulator to a load coupled to an output, the method comprising:
   regulating the voltage at the output using a plurality of single phase switching regulators coupled to the output and a feedback loop circuit; and
   preventing at least one of the single phase switching regulators from supplying current to the output at low load current in a first low power mode, wherein current supplied to the output by at least one of the remaining single phase switching regulators in the first low power mode is increased after the load current drops below a threshold using a first gain control circuit.

19. The method of claim 18 wherein regulating the voltage at the output using the plurality of single phase switching regulators and the feedback loop circuit further comprises:
   monitoring the output voltage using an amplifier that is coupled to at least one of the single phase switching regulators.

20. The method of claim 19 wherein the amplifier is coupled to each of the single phase switching regulators.

21. The method of claim 18 wherein the plurality of single phase switching regulators comprises three single phase switching regulators.

22. The method of claim 21 wherein preventing at least one of the single phase switching regulators from supplying current to the output at low load current in the first low power mode further comprises preventing two of the single phase switching regulators from outputting current to the load at low load current.

23. The method of the claim 18 wherein the plurality of single phase switching regulators comprises four single phase switching regulators.

24. The method of claim 23 wherein preventing at least one of the single phase switching regulators from supplying current to the output at low load current in the first low power mode further comprises preventing three of the single phase switching regulators from outputting current to the load at low load current.

25. The method of claim 23 wherein preventing at least one of the single phase switching regulators from supplying current to the output at low load current in the first low power mode further comprises preventing two of the single phase switching regulators from outputting current to the load at low load current.

26. The method of claim 18 wherein the plurality of single phase switching regulators are synchronous switching regulators.

27. The method of claim 18 wherein using the first gain control circuit further comprises:
   monitoring an output signal of the feedback loop circuit and adjusting an inductor current threshold of at least one of the remaining single phase switching regulators using an amplifier.

28. The method of claim 18 wherein using the first gain control circuit further comprises:
   shorting a resistor by turning ON a transistor coupled to the resistor when the load current drops below the load current threshold.

29. The method of claim 18 wherein the first gain control circuit comprises a first resistor coupled in parallel with a second resistor so that current flows through both resistors in the first low power mode.

30. The method of the claim 18 wherein the plurality of single phase switching regulators comprises two single phase switching regulators.

31. A method for supplying current from a multiple phase switching regulator to a load coupled to an output, the method comprising:
   regulating the voltage at the output using a plurality of single phase switching regulators coupled to the output and a feedback loop circuit;
   preventing at least one of the single phase switching regulators from supplying current to the output at low load current in a first low power mode, wherein the preventing at least one of the single phase switching regulators from supplying current to the output at low load current in the first low power mode further comprises preventing at least one single phase switching regulator from supplying current to the output when the load current falls below a threshold of a first comparator that is coupled to the feedback loop circuit; and
   preventing a second single phase switching regulator from outputting current to the load when the load current drops below a threshold of a second comparator that is less than the threshold of the first comparator, in a second low power mode.

32. The method of claim 31 wherein a current supplied to the output by a third of the single phase switching regulators in the second low power mode is increased using a second gain control circuit after the load current drops below the threshold of the second comparator.

33. The method of claim 32 wherein a resistor is shorted by turning ON a transistor coupled to the resistor when the load current drops below the threshold of the second comparator.

34. The method of claim 31 wherein a resistor in a resistor divider is shorted only when the load current is below the threshold of the first comparator.

35. A multiple phase switching regulator, comprising:
means for regulating the voltage at an output using a plurality of single phase switching regulators and a feedback loop circuit; and
means for causing a first of the single phase switching regulators to be OFF below a low load current threshold; and
means for increasing an output current threshold of a second of the single phase switching regulators below the low load current threshold.

36. The multiple phase switching regulator of claim 35 wherein:
the feedback loop circuit includes an amplifier coupled to at least one of the single phase switching regulators.

37. The multiple phase switching regulator of claim 36 wherein the amplifier is coupled to each of the single phase switching regulators.

38. The multiple phase switching regulator of claim 35 wherein:
the means for causing the first of the single phase switching regulators to be OFF below the low load current threshold further comprises a first comparator coupled to the feedback loop circuit and the first single phase switching regulator.

39. The multiple phase switching regulator of claim 35 wherein the plurality of single phase switching regulators comprises four single phase switching regulators.

40. The multiple phase switching regulator of claim 35 wherein:
the means for increasing the output current threshold of the second single phase switching regulator below the low load current threshold further comprises means for shorting a resistor that determines the output current threshold.

41. The multiple phase switching regulator of claim 35 wherein:
the means for increasing the output current threshold of the second single phase switching regulator below the low load current threshold further comprises means for directing current through a resistor in a resistor divider after the load current falls below the low load current threshold.

42. The multiple phase switching regulator of claim 35 wherein:
the means for increasing the output current threshold of the second single phase switching regulator below the low load current threshold further comprises means for coupling a first resistor in parallel with a second resistor after the load current falls below the low load current threshold.

43. The multiple phase switching regulator of claim 35 wherein:
the means for increasing the output current threshold of the second single phase switching regulator in the first low power mode further comprises means for shorting a resistor coupled to a current mirror circuit after the load current falls below the low load current threshold.

44. The multiple phase switching regulator of claim 35 wherein the plurality of single phase switching regulators are synchronous switching regulators.

45. The multiple phase switching regulator of claim 35 wherein the plurality of single phase switching regulators comprises three single phase switching regulators.

46. A multiple phase switching regulator, comprising:
means for regulating the voltage at an output using a plurality of single phase switching regulators and a feedback loop circuit;
means for causing a first of the single phase switching regulators to be OFF below a low load current threshold;
means for causing a second of the single phase switching regulators to be OFF below a second low load current threshold; and
means for increasing an output current threshold of a third of the single phase switching regulators below the second low load current threshold.

47. A multiple phase switching regulator, comprising:
a plurality of single phase switching regulator stages couple to an output; and
a first comparator coupled to a feedback loop circuit that prevents a first one of the single phase switching regulator stages from providing output current to a load coupled to the output after the load current drops below a threshold of the first comparator, wherein at least a second one of the single phase switching regulators stages comprises:
a first gain control circuit coupled to the first comparator that causes the output current of the second single phase switching regulator stage to increase after the load current drops below the threshold of the first comparator.

* * * * *